US012520029B2

(12) United States Patent
Narumi et al.

(10) Patent No.: US 12,520,029 B2
(45) Date of Patent: Jan. 6, 2026

(54) IMAGING SYSTEM USING SENSOR(S) AND CAMERA FOR DETERMINING VELOCITY, POSITION AND/OR TIMING OF AN OBJECT

(71) Applicant: Panasonic Intellectual Property Management Co., Ltd., Osaka (JP)

(72) Inventors: Kenji Narumi, Osaka (JP); Yasuhisa Inada, Osaka (JP); Yumiko Kato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 18/597,998

(22) Filed: Mar. 7, 2024

(65) Prior Publication Data
US 2025/0080825 A1    Mar. 6, 2025

Related U.S. Application Data

(63) Continuation of application No. PCT/JP2022/027351, filed on Jul. 12, 2022.

(30) Foreign Application Priority Data

Oct. 1, 2021   (JP) ................................. 2021-162616
Dec. 10, 2021   (JP) ................................. 2021-200895

(51) Int. Cl.
*H04N 23/61*    (2023.01)
*G06V 10/25*    (2022.01)
(Continued)

(52) U.S. Cl.
CPC ............. *H04N 23/61* (2023.01); *G06V 10/25* (2022.01); *G06V 20/625* (2022.01); *H04N 23/6812* (2023.01); *G07B 15/00* (2013.01)

(58) Field of Classification Search
CPC .. G01S 13/345; H04N 23/61; H04N 23/6812; G06V 10/25; G06V 20/625; G07B 15/00
(Continued)

(56) References Cited

U.S. PATENT DOCUMENTS 3,243,806 A      3/1966   Gustav
9,103,671 B1 *   8/2015   Breed ................... G01S 13/865
(Continued)

FOREIGN PATENT DOCUMENTS

JP    2000-003495    1/2000
JP    2005-056000    3/2005

OTHER PUBLICATIONS

The EPC Office Action dated Dec. 10, 2024 for the related European Patent Application No. 22875542.7.
(Continued)

*Primary Examiner* — Justin W Rider
(74) *Attorney, Agent, or Firm* — Rimon P.C.

(57) ABSTRACT

An imaging system includes a sensor that measures a velocity of a moving object, a camera that is different from the sensor and images the object, and a processing circuit that controls the operations of the sensor and the camera, wherein the processing circuit causes the sensor to generate velocity information on the object and measurement timing information on the velocity by causing the sensor to measure the velocity of the object, generates control data, including imaging timing information on the camera, in accordance with (a) position information on the object or distance information on the object at a time of velocity measurement, (b) the velocity information, and (c) the measurement timing information, and causes the camera to output, in response to the control data, image data including image information on the object.

18 Claims, 17 Drawing Sheets

(51) Int. Cl.
*G06V 20/62* (2022.01)
*G07B 15/00* (2011.01)
*H04N 23/68* (2023.01)

(58) Field of Classification Search
USPC .......................................................... 348/149
See application file for complete search history.

(56) References Cited

U.S. PATENT DOCUMENTS

| | | | |
|---|---|---|---|
| 11,187,796 B2* | 11/2021 | Choi ....................... | G01S 13/53 |
| 2003/0019933 A1* | 1/2003 | Tsikos ...................... | G06K 7/10 |
| | | | 235/454 |
| 2014/0210646 A1* | 7/2014 | Subramanya ........... | B61L 29/28 |
| | | | 348/148 |
| 2022/0358835 A1* | 11/2022 | Graver ................. | G08G 1/0116 |

OTHER PUBLICATIONS

International Search Report of PCT application No. PCT/JP2022/027351 dated Sep. 27, 2022.

* cited by examiner

IMAGING SYSTEM USING SENSOR(S) AND CAMERA FOR DETERMINING VELOCITY, POSITION AND/OR TIMING OF AN OBJECT

BACKGROUND

1. Technical Field

The present disclosure relates to an imaging system, a processing device, and a method performed by a computer in the imaging system.

2. Description of the Related Art

ETC (Electronic Toll Collection System) pays a toll in a toll road such as an express way without stopping a vehicle at a toll gate. Vehicle classification is an element that determines a fee structure of tolls. Vehicles are classified according to the size and axle count of the vehicle out of attribute information of the vehicles. When a vehicle passes through an ETC lane, a device on board the vehicle mutually communicates with a road-side antenna installed on the lane, information on an entrance toll gate and data, such as the vehicle classification, used to calculate the toll are exchanged. In this way, the toll is calculated.

The ETC individually recognizes the vehicle with a vehicle detector and, in accordance with recognition results, performs operations including, for example, starting or ending mutual communication, switching a roadside display, and opening or closing a gate. Many of vehicle detectors are optical detectors and multiple vehicle detectors are installed in accordance with multiple determination criteria, such as the length of the vehicle and running direction. In order to calculate the toll, the ETC further determines the presence or absence of towing with a vehicle having a traction structure or measures the axle count of a large vehicle. Tread sensors mounted on the ground are used as axle sensors counting the axle count.

Current ETCs are equipped with gates and each vehicle is supposed to slow down near the gate. Demand for an ETC that allows each vehicle to pass through the gate without slowing down may be expected to increase in the future to alleviate traffic congestion. The ETC may use an imaging system that captures images keeping a vehicle within a captured image without framing out the vehicle that moves at a high velocity.

Japanese Unexamined Patent Application Publication No. 2000-3495 discloses an automated imaging device that outputs a capture instruction to an imaging device if the velocity of a vehicle measured by radar exceeds a fixed value. Japanese Unexamined Patent Application Publication No. 2005-56000 discloses a device that measures the running velocity of a vehicle using wave from a mobile phone and captures an image of a particular vehicle in accordance with the measurement results.

SUMMARY

One non-limiting and exemplary embodiment provides an imaging system that may capture images of not only an object moving slowly but also an object moving fast without framing out the objects.

An imaging system according to an aspect of the disclosure includes a sensor that measures a velocity of a moving object, a camera that is different from the sensor and images the object, and a processing circuit that controls operations of the sensor and the camera, wherein the processing circuit causes the sensor to generate velocity information on the object and measurement timing information on the velocity by causing the sensor to measure the velocity of the object, generates control data, including imaging timing information on the camera, in accordance with (a) position information on the object or distance information on the object at the same time as the measurement of the velocity, (b) the velocity information, and (c) the measurement timing information, and causes the camera to output, in response to the control data, image data including image information on the object.

Generic or specific aspects of the disclosure may be implemented using a system, a device, a method, an integrated circuit, a computer program or a recording medium, such as a computer-readable recording disc, or may be implemented using any combination of the system, the device, the method, the integrated circuit, the computer program and the recording medium. For example, the computer-readable recording media may include a non-volatile recording medium, such as a Compact Disc-Read Only Memory (CD-ROM). The device may be a single device. If the device includes two or more devices, the two or more devices may be installed within a single apparatus or may be separately installed in separate two or more apparatuses. According to the description and the claims, the "device" may signify not only a single device but also a system including multiple devices.

The technique disclosed in the disclosure may implement an imaging system that images not only an object that moves at a slow velocity but also an object that moves at a high velocity without framing out the objects.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
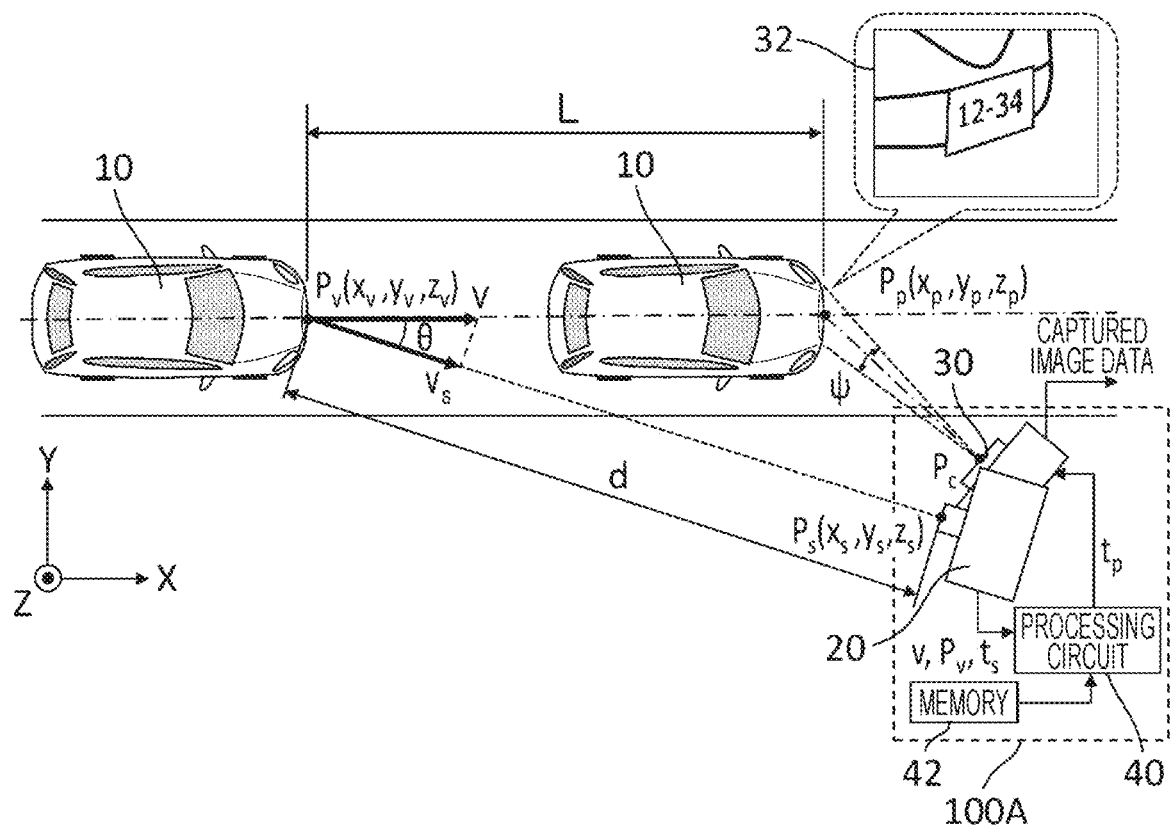
FIG. 1 schematically illustrates a configuration of an imaging system and a positional relationship between the imaging system and a vehicle according to a first exemplary embodiment of the disclosure.

Embodiments described with reference to the drawings are generic or specific examples. Numerical values, shapes, materials, elements, a layout position of the elements, a connection configuration of the elements, steps and the order of the steps in the embodiments are described for exemplary purposes only, and are not intended to limit the technique of the disclosure. Elements not described in independent claims indicative of a generic concept, from among the elements of the embodiments, may be any elements. The drawings are not necessarily drawn to scale. Also in the drawings, substantially identical or similar elements in configuration are designated with the same reference symbol. Description once made may be omitted or simplified.

According to the disclosure, a circuit, a unit, an apparatus, a member, part or whole of a module, part or whole of a functional block in a block diagram may be implemented by one or more electronic circuits including a semiconductor device, an integrated circuit (IC), large scale integration (LSI) chip. The LSI chip or IC may be integrated into a single chip or a combination of multiple chips. For example, functional blocks other than a memory may be integrated into a single chip. The LSI chip or IC are cited herein, but depending on the degree of integration, abbreviation thereof may change, and, for example, a system LSI chip, a very large scale integration (VLSI) chip, or a ultra large scale integration (ULSI) chip may also be employed. Field Programmable Gate Array (FPGA) programmed after the manufacturing of the LSI chip or a reconfigurable logic device that allows a connection relationship of the inside of the LSI chip to be reconfigured or an internal section of the inside of the LSI to be set up may also be employed.

In addition, function or operation of the circuit, the unit, the apparatus, the member, or the part or whole of the module may be performed by software processing. In such a case, software is stored on a non-transitory recording medium, such as one or more ROMs, optical disk or a hard disk drive and when the software is performed by a processing device (processor), a function identified by the software is performed by the processing device (processor) or a peripheral device. A system or an apparatus may include one or more non-transitory recording media, the processing device (processor), and an involved hardware device, such as an interface.

According to the disclosure, "light" refers to electronic magnetic waves including not only visible light (wavelength ranging from about 400 nm to about 700 nm) but also ultraviolet light (wavelength ranging from about 10 nm to about 400 nm) and infrared light (wavelength ranging from about 700 nm to about 1 mm).

Underlying knowledge forming a basis of the present disclosure is described below. Japanese Unexamined Patent Application Publication No. 2000-3495 discloses how a running vehicle is imaged by providing an image capturing instruction to an imaging device but does not disclose a timing of imaging the running vehicle, namely, a method of determining a timing of activating a shutter of a camera. Japanese Unexamined Patent Application Publication No. 2005-56000 discloses how a vehicle is imaged when the vehicle comes into a predetermined imaging region but does not disclose a method of determining a timing when the predetermined imaging region is reached.

When a vehicle is imaged from a sufficiently far place with a camera at a wide angle of view, imaging may be performed without involving accurate determination of imaging timing in a manner free from framing out the running vehicle. In such a case, however, a license plate and/or the face of a driver may be imaged smaller in an image, leading to a lower resolution. As a result, there arises a problem that it may be difficult to acquire information on a vehicle model and/or a driver at a high accuracy. Particularly during image capturing at night, an amount of ambient light is smaller, leasing to a smaller S/N ratio of an image, and thus information on an object is not easy to acquire. Furthermore, if a vehicle having a short inter-vehicular distance to a vehicle ahead is imaged, there also arises a problem that the license plate of the vehicle serving as an imaging target may be hidden by the vehicle ahead.

The inventor of the disclosure has found an imaging system free from the problem described above. In imaging systems of embodiments of the disclosure, a sensor measures the velocity of a moving object and the object is imaged by a camera at an appropriate timing in accordance with the measurement results. As a result, the moving object may be imaged without framing out the moving object being. The imaging systems of the embodiments of the disclosure are described below.

An imaging system according to a first aspect includes a sensor that measures a velocity of a moving object, a camera that is different from the sensor and images the object, and a processing circuit that controls operations of the sensor and the camera. The processing circuit causes the sensor to generate velocity information on the object and measurement timing information on the velocity by causing the sensor to measure the velocity of the object, generates control data, including imaging timing information on the camera, in accordance with (a) position information on the object or distance information on the object at the same time as the measurement of the velocity, (b) the velocity information and (c) the measurement timing information, and causes the camera to output, in response to the control data, image data including image information on the object.

The imaging system may image not only an object moving a low velocity but also an object moving at a high velocity in a manner free from framing out.

In the imaging system according to a second aspect in view of the imaging system of the first aspect, the processing circuit may cause the camera to image the object in accordance with the imaging timing information on the camera.

The imaging system may output the image data on the object by imaging the object.

In the imaging system according to a third aspect in view of the imaging system of the first aspect, the processing circuit may cause the camera to capture a video of the object and output the image data from the video captured by the camera.

The imaging system may output the image data on the object from the video.

In the imaging system according to a fourth aspect in view of one of the imaging systems of the first through third aspects, the processing circuit may cause the sensor to measure the position of the object or distance to the object during velocity measurement and the velocity at the same time.

The imaging system may more easily calculate the imaging timing.

In the imaging system according to a fifth aspect in view of one of the imaging systems of the first through fourth aspects, the control data may further include at least one piece of information determining a Region Of Interest (ROI) included in an image captured by the camera, information determining a focus position of the camera, and information determining a position of the camera.

The imaging system may control the operation of the camera in accordance with the control data.

In the imaging system according to a sixth aspect in view of one of the imaging systems of the first through fifth aspects, the control data may include at least one piece of information determining a pan rotation angle of the camera and/or a tilt rotation angle of the camera and information determining a zoom magnification of the camera.

The imaging system may control the operation of the camera in accordance with the control data.

In the imaging system according to a seventh aspect in view of one of the imaging systems of the first through sixth aspects, the sensor may be a Frequency Modulated Continuous Wave (FMCW)—Light Detecting and Ranging (LiDAR) device.

The imaging system may acquire, accurately at the same time, position information on the object or distance information to the object and velocity information.

In the imaging system according to an eighth aspect in view of the imaging system of the fifth aspect, the control data may further include information determining ROI included in an image captured by the camera. The processing circuit causes the camera to extract the ROI from the captured image.

The imaging system may output ROI image data.

In the imaging system according to a ninth aspect in view of one of the imaging systems of the first through eighth aspects, the processing circuit may generate, in accordance with the image data, classification data including classification information on the subject.

The imaging system may generate the classification information on the object.

In the imaging system according to a tenth aspect in view of the imaging system of the fifth aspect, the camera may include an actuator that moves the position of the camera in parallel displacement. The control data further includes information determining the position of the camera. The processing circuit moves the position of the camera in parallel displacement with the actuator.

The imaging system may adjust the position of the camera.

In the imaging system according to an eleventh aspect in view of the imaging system of the sixth aspect, the camera may further include an actuator that varies an orientation of the camera. The control data may further include information determining the orientation of the camera. The processing circuit may cause the camera to vary the orientation of the camera with the actuator.

The imaging system may adjust the orientation of the camera.

In the imaging system according to a twelfth aspect in view of the imaging system of the sixth aspect, the camera may include an actuator that modifies a zoom magnification of the camera. The control data may include information determining the zoom magnification of the camera. The processing circuit may cause the camera to modify the zoom magnification of the camera with the actuator.

The imaging system may adjust the zoom magnification of the camera.

In the imaging system according to a thirteenth aspect in view of one of the imaging systems of the first through twelfth aspects, the control data may further include at least one piece of information determining exposure time of the camera and information determining an opening and closing degree of aperture of the camera.

The imaging system may control the operation of the camera in accordance with the control data.

In the imaging system according to a fourteenth aspect in view of one of the imaging systems of the first through thirteenth aspects, the object may be a vehicle. An image indicated by the image data may include an image of a license plate of a running vehicle.

The imaging system may image the license plate of the running vehicle.

In the imaging system according to a fifteenth aspect in view of one of the imaging systems of the first through thirteenth aspects, the object may be a vehicle. An image indicated by the image data may include an image of a driver or a passenger of the vehicle.

The imaging system may image the driver or the passenger of the running vehicle.

In the imaging system according to a sixteenth aspect in view of one of the imaging systems of the first through fifteenth aspects, the object may be a vehicle. The vehicle may include wheels. The sensor may measure a running velocity of the vehicle and a rotating velocity of the wheel. The velocity information may be information on the running velocity of the vehicle and the rotating velocity of the wheel.

The imaging system acquires the information on the running velocity of the vehicle and the rotating velocity of the wheel.

In the imaging system according to a seventeenth aspect in view of the imaging system of the sixteenth aspect, the processing circuit may generate, in accordance with the velocity information, axle count data including axle count information on the vehicle.

The imaging system may generate the axle count information on the vehicle.

In the imaging system according to an eighteenth aspect in view of the imaging system of the seventeenth aspect, the processing circuit may generate, in accordance with the image information and the axle count information, vehicle model data including vehicle model information on the vehicle.

The imaging system may generate the vehicle model information on the vehicle.

In the imaging system according to a nineteenth aspect in view of one of the imaging systems of the first through eighteenth aspects, the processing circuit may cause the sensor to measure a plurality of times the velocity at different time points. The velocity information may be information on the velocity that has been measured the plurality of times. The measurement timing information may be information on timings at which the velocity has been measured the plurality of times.

The imaging system may more accurately determine the imaging timing in accordance with acceleration or deceleration of the object.

The imaging system according to a twentieth aspect in view of one of the imaging systems of the first through nineteenth aspects may further include another sensor that measures the velocity of the object from a direction different from the direction of the sensor. The processing circuit may cause the other sensor to generate another piece of the velocity information on the object by causing the other sensor to measure the velocity of the object, and may determine the velocity of the object in accordance with the velocity information and the other piece of the velocity information.

The imaging system may accurately detect the direction of movement of the object and more accurately determine the imaging timing.

A processing device according to a twenty-first aspect includes a processor and a memory that stores a computer program to be executed by the processor. The computer program causes the processor to perform a process including: causing a sensor to generate velocity information on an object and measurement timing information on a velocity of the object by causing the sensor to measure the velocity of the object, generating control data, including imaging timing information on a camera different from the sensor, in accordance with (a) position information on the object or distance information on the object at a time of velocity measurement, (b) the velocity information, and (c) the measurement timing information, and causing the camera to output, in response to the control data, image data including image information on the object.

The processing device may image not only an object moving a slow velocity but also an object moving at a high velocity without framing out the objects.

A method according to a twenty-second aspect is to be performed by a computer in an imaging system. The method includes causing a sensor to generate velocity information on an object and measurement timing information on a velocity of the object by causing the sensor to measure the velocity of the object, generating control data, including imaging timing information on a camera different from the sensor, in accordance with (a) position information on the object or distance information on the object at a time of velocity measurement, (b) the velocity information, and (c) the measurement timing information, and causing the camera to output, in response to the control data, image data including image information on the object.

The method may image not only an object moving at a slow velocity but also an object moving at a high speed without framing out the objects.

First Embodiment

A configuration of the imaging system of a first embodiment of the disclosure is described below with reference to FIG. 1. FIG. 1 schematically illustrates a configuration of the imaging system and a positional relationship between the imaging system and a vehicle according to the first exemplary embodiment of the disclosure. For clarity of explanation, FIG. 1 illustrates mutually perpendicular X, Y, and Z axes. These axes are not intended to limit the orientation of the vehicle and the imaging system and the vehicle and the imaging system may take any orientation. It is noted that +X axis direction is the direction of an arrow mark of X axis and −X axis direction is the direction opposite to the +X axis direction. The same is true of ±Y directions and Z directions.

A vehicle 10 illustrated in FIG. 1 runs in the +X direction on a road that is a surface parallel to an XY plane. The running velocity of the vehicle 10 may be a speed limit of an expressway. An imaging system 100A illustrated in FIG. 1 includes a sensor 20, a camera 30 and a processing circuit 40. An imaging target in the first embodiment is the license plate of the vehicle 10.

The processing circuit 40 in the imaging system 100A causes the sensor 20 to measure a velocity v as a running velocity v of the vehicle 10. In accordance with the measurement results, the processing circuit 40 causes the camera 30 to image the license plate of the vehicle 10 at an appropriate timing and generate and output captured image data on the license plate. As a result, the license plate of the vehicle 10 running at a high velocity may thus be imaged without being framed out from a captured image 32 illustrated in an enlarged view in FIG. 1.

Elements included the vehicle 10 and the imaging system 100A are described below.

The vehicle 10 is a typical car having four wheels but may be a large truck having four or more wheels or a motorcycle having two wheels.

The sensor 20 measures the velocity v of the vehicle 10 and a velocity measurement position $P_v$ of the vehicle 10. The velocity measurement position $P_v$ of the vehicle 10 is the position of the vehicle 10 at a time of velocity measurement, and specifically, is a three-dimensional position of a location of the vehicle 10 on which the sensor 20 measures the velocity v. Referring to FIG. 1, the location is a front portion of the vehicle 10. A method of measuring the velocity v and the velocity measurement position $P_v$ of the vehicle 10 is described in detail below.

The sensor 20 may desirably measure the velocity v of the vehicle 10 at a location away from the vehicle 10. In such a case, the sensor 20, the camera 30 and the processing circuit 40 may be integrated into a unitary body, leading to a generally compact imaging system 100A. The sensor 20 may desirably measure the velocity v and the velocity measurement position $P_v$ of the vehicle 10 at the same time. In such a case, the calculation of an imaging timing is facilitated, leading to a simpler imaging system. The sensor 20 may desirably include an oscillation source that periodically performs frequency modulation and measure the velocity and the velocity measurement position of the vehicle (in other words, measure the velocity and the velocity measurement position of the vehicle via an FMCW method) by causing a wave reflected from the vehicle and a reference wave to interfere with each other. In such a case, the velocity v and the velocity measurement position $P_v$ of the vehicle 10 may be measured more accurately at the same time. The sensor 20 may desirably be a Frequency Modulated Continuous Wave (FMCW)—Light Detecting and Ranging (LiDAR) device. In this case, by irradiating the vehicle 10 with a point-converged laser beam, a measurement direction may be determined with a higher resolution and the velocity v and a relative distance d to the vehicle 10 may be measured at the same time from the location away from the vehicle 10. Since a light receiving area of reflection light may be limited by a lens, a possibility of occurrence of an error in distance and velocity caused by multi-paths may be reduced. The configuration of the FMCW-LiDAR device is described in detail below.

It is noted that the sensor 20 may be a doppler radar device that measures the velocity v of the vehicle 10 via doppler radar. Alternatively, the sensor 20 may be a device that measures the velocity v of the vehicle 10 via an image of multiple frames captured by another camera.

The camera 30 images at least part of the vehicle 10 within a range of an angle of view $\Psi$. The camera 30 may be a RBG camera or a monochrome camera. The camera 30 is a device different from the sensor 20.

The processing circuit 40 controls the operations of the sensor 20 and the camera 30 and processes signals output from the sensor 20 and the camera 30. The operation of the processing circuit 40 is described in detail below.

A computer program executed by the processing circuit 40 is stored on the memory 42, such as a ROM or a Random Access Memory (RAM). The imaging system 100A includes a processing device including the processing circuit 40 and the memory 42. The processing circuit 40 and the memory 42 may be integrated into a single IC chip or a single LSI chip or may be integrated into a single circuit board or may be arranged on separate circuit boards. The function of the processing circuit 40 may be distributed on multiple circuits. The processing device may be installed at a remote place away from the other elements and control the operations of the sensor 20 and the camera 30 via a wired or wireless communication network.

If the processing circuit 40 performs the operation thereof using a combination of electronic circuits (logic circuits), the memory 42 storing a computer program is not used.

Unlike the example illustrated in FIG. 1, the processing circuit 40 may be mounted on the sensor 20 or the camera 30. Alternatively, part of the processing circuit 40 may be mounted on the sensor 20 and the rest of the processing circuit 40 may be mounted on the camera 30.

Figure 2A:
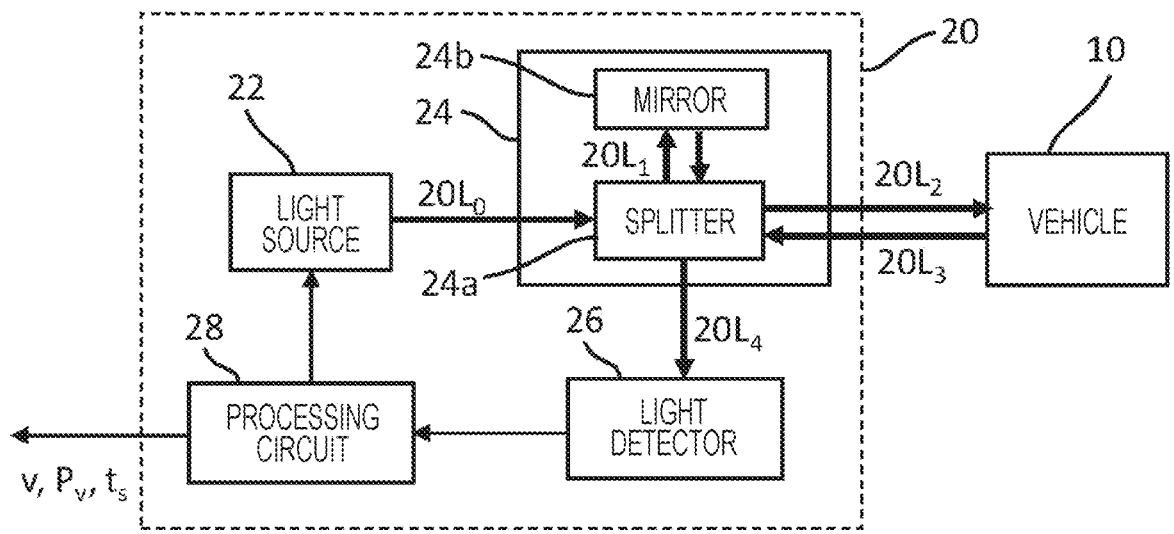
FIG. 2A is a block diagram schematically illustrating a configuration of a sensor serving as a Frequency Modulated Continuous Wave (FMCW)—Light Detecting and Ranging (LiDAR) device.
Figure 2B:
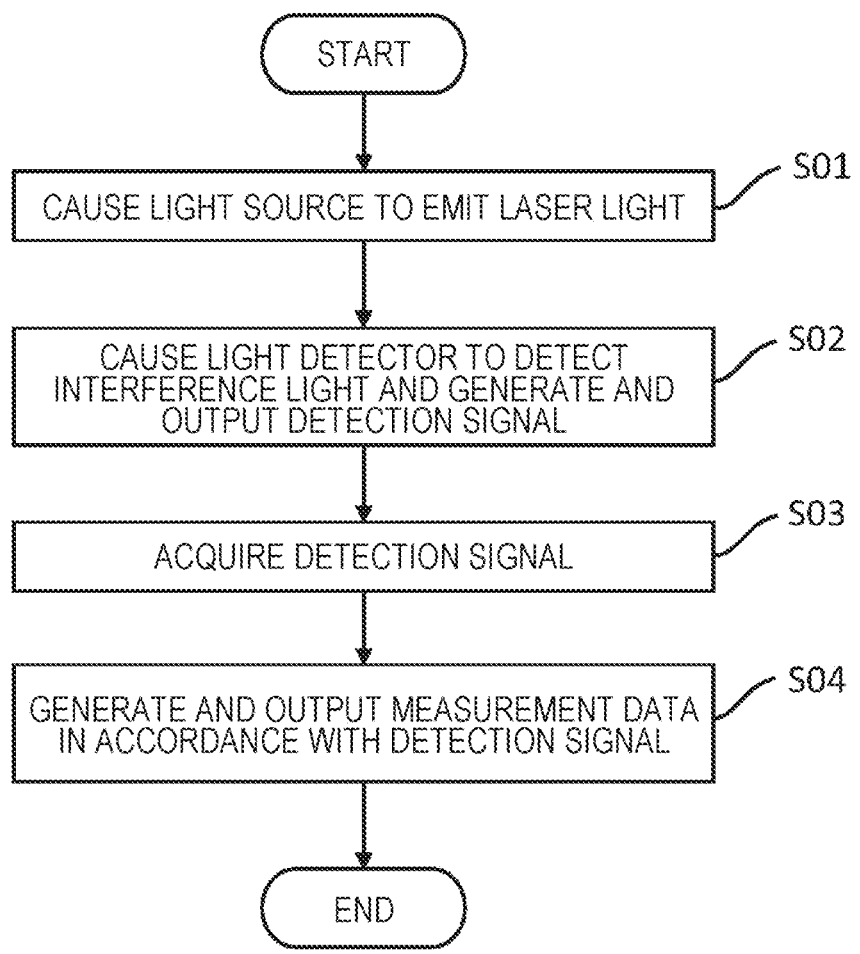
FIG. 2B is a flowchart schematically illustrating an example of an operation performed by a processing circuit included in the sensor.
Figure 3:
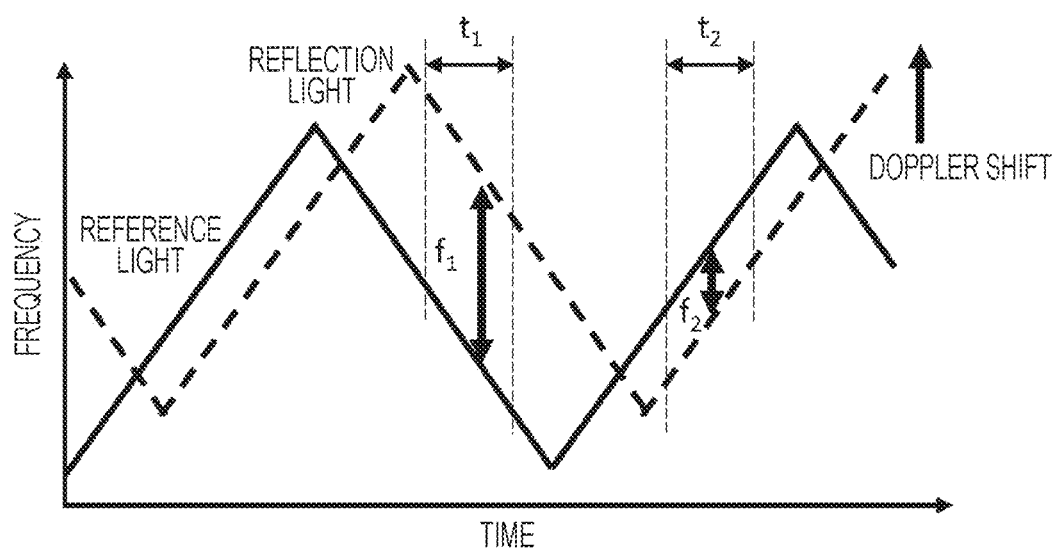
FIG. 3 schematically illustrates a time variation in frequencies of reference light and reflection light when the vehicle runs.

Referring to FIG. 2A through FIG. 3, the configuration example and the principle of the FMCW-LiDAR device are described. FIG. 2A is a block diagram schematically illustrating the configuration of the sensor 20 serving as the FMCW-LiDAR device. The sensor 20 illustrated in FIG. 2A includes a light source 22, an interference optical system 24, a light detector 26, and a processing circuit 28. The interference optical system 24 includes a splitter 24a and a mirror 24b. Each arrow-headed thick line denotes the direction of each flow of light in FIG. 2A.

The light source 22 emits laser light $20L_0$ that is to irradiate the vehicle 10. The light source 22 may emit the laser light $20L_0$ continuously or may emit the laser light $20L_0$ intermittently with a repetition frequency of several tens of Hz to several hundreds of Hz. Alternatively, the light source 22 may emit the laser light $20L_0$ after another sensor detects the approaching of the vehicle 10.

The frequency of the laser light $20L_0$ may be modulated as a triangle wave. The modulation period of the frequency may be, for example, 10 ns or longer and 10 ms or shorter. The modulation amplitude of the frequency may be, for example, 100 MHz or higher and 1 THz or lower. The wavelength of the laser light $20L_0$ may be included, for example, in a wavelength region of near infrared light of 700 nm or longer and 2000 nm or shorter. Since the sunlight has a smaller amount of light in the near infrared light than in the visible light, the use of the near infrared light as the laser light $20L_0$ may reduce the effect of the sunlight as noise. Alternatively, the wavelength of the laser light $20L_0$ may be included in the wavelength region of visible light of 400 nm or longer and 700 nm or shorter or may be included in the wavelength region of ultraviolet light.

The interference optical system 24 splits the laser light $20L_0$ emitted from the light source 22 into reference light $20L_1$ and irradiation light $20L_2$ with the splitter 24a and radiates the reference light $20L_1$ to a mirror 24b and the irradiation light $20L_2$ to the vehicle 10. The interference optical system 24 causes, with the splitter 24a, reference light $20L_1$ reflected and returned from the mirror 24b and reflection light $20L_3$ reflected and returned from the vehicle 10 irradiated with the irradiation light $20L_2$ to be interfere with each other and generates interference light $20L_4$ and then irradiates the light detector 26 with the interference light $20L_4$. The light detector 26 generates a detection signal by detecting the interference light $20L_4$ and outputs the detection signal.

FIG. 2B is a flowchart schematically illustrating an example of an operation performed by the processing circuit 28 in the sensor 20. The processing circuit 28 performs operations in steps S01 through S04 illustrated in FIG. 2B.
Step S01
The processing circuit 28 causes the light source 22 to emit laser light.
Step S02
The processing circuit 28 causes the light detector 26 to detect interference light and generate and output the detection signal.
Step S03
The processing circuit 28 acquires the detection signal.
Step S04
The processing circuit 28 generates measurement data in response to the detection signal and outputs the measurement data. The measurement data includes measurement timing information on measurement time $t_s$, velocity information on the velocity v of the vehicle 10 and velocity measurement position information on the velocity measurement position $P_v$. The measurement time $t_s$ is time when the processing circuit 28 acquires the detection signal.

The sensor 20 does not necessarily include the processing circuit 28 and the processing circuit 40 included in the imaging system 100A may perform operations in steps S01 through S04.

FIG. 3 schematically illustrates a time variation in frequencies of reference light and reflection light when the vehicle 10 runs. Solid lines denote the reference light and broken lines denote reflection light beam. The frequency of the reference light in FIG. 3 repeats a time variation in a triangle wave. During every one period, the frequency of the reflection light linearly increases and then linearly decreases by an amount equal to an amount of frequency of increase. In comparison with the frequency of the reference light, the frequency of the reflection light beam shifts in a positive direction along time axis by an amount of time from the emission of light from the sensor 20 to the reception of light reflected and returned from the vehicle 10. Moreover, as a relative distance d between the vehicle 10 and the sensor 20 becomes shorter, the frequency of the reflection light is shifted in the positive direction along the frequency axis due to the doppler shift in comparison with the case where the vehicle 10 stands still.

Interference light caused by superimposing the reference light and the reflection light has a beat frequency corresponding to a difference between the frequency of the reflection light and the reference light frequency. The beat frequency becomes different depending on whether the frequencies of the reference light and the reflection light beam linearly increase or linearly decrease. In the example in FIG. 3, a beat frequency $f_1$ with the frequencies of the two signals linearly increasing is higher than a beat frequency $f_2$ with the frequencies of the two signals linearly decreasing.

$f_{FMCW}$ represents a modulation frequency that is the reciprocal of a time period of the frequency of the reference light, $\Delta f$ represents a frequency difference between the maximum value and the minimum value of the frequency of the reference light, c represents the velocity of the light in a vacuum, and $\lambda$ represents the wavelength of the reference light, and a relative distance d and a relative velocity $v_s$ of the sensor 20 and the vehicle 10 are respectively expressed by the following equations (1) and (2).

$$d = \frac{c}{8\Delta f \cdot f_{FMCW}}(f_1 + f_2) \quad (1)$$

$$v_s = \lambda/4(f_2 - f_1) \quad (2)$$

The beat frequencies $f_1$ and $f_2$ are measured in a time region where the frequencies of the reference light and the reflection light are nearly constantly increasing or decreasing. FIG. 3 schematically illustrates a time variation in the frequencies of reference light and reflection light and a measurement time region of the beat frequency when the vehicle 10 runs. The beat frequency $f_1$ or $f_2$ is respectively measured for time region $t_1$ or $t_2$. If the beat frequency is measured for the time regions $t_1$ and $t_2$, a variation in each of the beat frequencies $f_1$ and $f_2$ becomes smaller within the measurement time region and a measurement accuracy in each of the relative distance d and the relative velocity $v_s$ increases.

Furthermore, equations (1) and (2) and FIG. 3 indicate that each of the relative distance d and the relative velocity $v_s$ is calculated from beat signals acquired from the same measurement time region. This signifies that if the sensor 20 is a FMCW device, it is possible to measure, in principle, the velocity v and the velocity measurement position $P_v$ of the vehicle 10 more accurately at the same time.

If the sensor 20 is a doppler radar, the measurement time region of the relative distance is time from the transmission of a pulse to the reception of the pulse. On the other hand, the measurement time region of the relative velocity is time throughout which an object is irradiated with a pulse (namely, a pulse width) and is different from the measurement time region of the relative distance in a strict sense. The use of an FMCW sensor as the sensor 20 is more desirable since the relative distance and the relative velocity may be more accurately measured at the same time.

Referring to FIG. 1, $\theta$ represents an angle between the running direction of the vehicle 10 and a direction opposite to a measurement direction and $P_s(x_s, y_s, z_s)$ represents a sensor position of the sensor 20 as a three-dimensional position, and measurement position $P_v$ $(x_v, y_v, z_v)$ and the velocity v of the vehicle 10 are respective represented by equations (3) and (4) described below. The measurement direction is a travel direction of the irradiation light $20L_2$ emitted from the sensor 20. The sensor position $P_s$ is positioned at the center of a light detection plane of the sensor 20.

$$(x_v, y_v, z_v) = (x_s - d \cdot \cos\theta, y_s + d \cdot \sin\theta, z_s) \quad (3)$$

$$v = \frac{v_s}{\cos\theta} \quad (4)$$

The measurement direction is set to be parallel with a road surface. As long as the angle between the measurement direction and the road surface is known even with the measurement direction intersecting the road surface, it is still possible to calculate the velocity measurement position $P_v$ of the vehicle 10. As described above, the velocity measurement position $P_v$ and the velocity v may be respectively determined in accordance with the relative distance d and the relative velocity $v_s$.

The velocity measurement position information included in the measurement data output from the sensor 20 may be information on the velocity measurement position $P_v$ or information on the relative distance d. The relative distance d may still be converted into the velocity measurement position $P_v$ through equation (3). Similarly, the velocity information included in the measurement data output from the sensor 20 may be information on the velocity information v or information on the relative velocity $v_s$. The relative velocity $v_s$ may still be converted into the velocity v through equation (4).

The vehicle 10 has a considerable size and if the sensor 20 continuously measures velocity, multiple pieces of the velocity information may be output while the vehicle 10 is continuously irradiated with the laser light. In order to select an effective piece of the velocity information from the multiple pieces of the velocity information, the velocity measurement position information measured at the same time may be checked against the velocity information. For example, if a front portion of the vehicle 10 is irradiated with the laser light, the velocity measurement position $P_v$ changes in an X direction and a Y direction and if a side portion of the vehicle 10 is irradiated with the laser light, the velocity measurement position is almost unchanged. The location of the vehicle irradiated with the laser light may be determined by inspecting the changing trend of the velocity measurement position $P_v$.

If the measurement direction and the running line of the vehicle 10 continue to be constant, the velocity measurement position $P_v$ of the vehicle 10 is a position where the measurement direction starting at a sensor position $P_s$ intersects the running line of the vehicle 10 and the velocity measurement position $P_v$ is thus uniquely determined. This does not involve calculating the velocity measurement position $P_v$ of the vehicle 10 through equations (1) and (3). In such a case, the measurement data may not necessarily include the velocity measurement position information. It is noted, however, that the calculation of the velocity measurement position $P_v$ of the vehicle 10 may lead to a more accurate velocity measurement position $P_v$.

Figure 4:
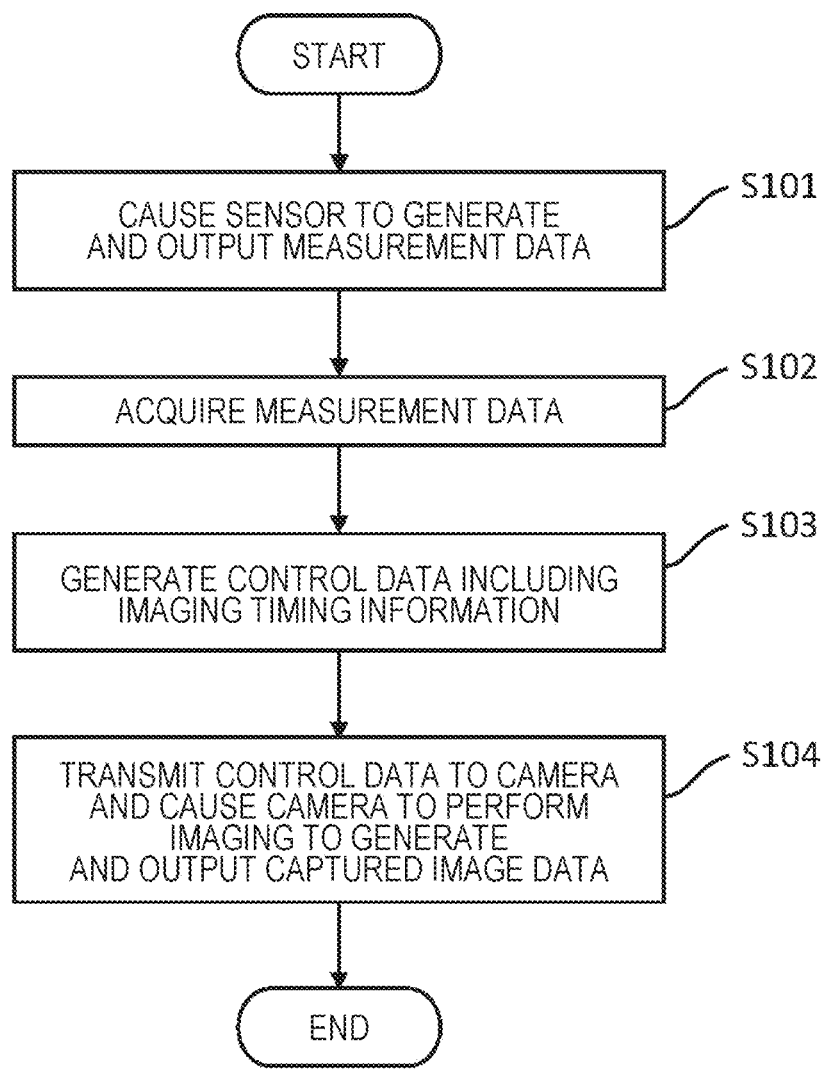
FIG. 4 is a flowchart schematically illustrating an example of an operation performed by the processing circuit of the first embodiment.

An example of the operation of the processing circuit 40 of the first embodiment in which the camera 30 images the license plate of the vehicle 10 at an appropriate timing is described in detail below with reference to FIG. 4. FIG. 4 is a flowchart schematically illustrating the example of the operation performed by the processing circuit 40 of the first embodiment. The processing circuit 40 performs operations in steps S101 through S104 illustrated in FIG. 4.

Step S101

The processing circuit 40 causes the sensor 20 to measure the velocity v of the vehicle 10 and the relative distance d or the velocity measurement position $P_v$ of the vehicle 10 and generate and output the measurement data. The measurement data includes the velocity information, the velocity measurement position information, and the imaging timing information on the vehicle 10. The generation method of the measurement data has described with reference to FIG. 2B.

Step S102

The processing circuit 40 acquires the measurement data.

Step S103

The processing circuit 40 generates control data, including the imaging timing information related to the imaging time $t_p$, in accordance with the information described below. The information serving as a basis of the control data includes (a) position information on the vehicle 10 or distance information on the vehicle 10 at the velocity measurement time, (b) the velocity information on the vehicle 10, and (c) the measurement timing information.

The processing circuit 40 determines as a distance of travel a distance between an imaging position $P_p$ of the vehicle 10 and the velocity measurement position $P_v$ of the vehicle 10. The velocity measurement position $P_v$ of the vehicle 10 may be determined in accordance with the velocity measurement position information included in the measurement data or may be determined as previously described as the position where the measurement direction intersects the running line of the vehicle 10. The imaging position $P_p$ of the vehicle 10 is a three-dimensional position from which the camera 30 is enabled to image a driver or a passenger at the center of the angle of view ψ of the camera 30. If the imaging direction and the running line of the vehicle 10 continue to be constant, the imaging position $P_p$ is a position where the imaging direction starting at a camera position $P_c$ intersects the running line of the vehicle 10. The camera position $P_c$ is positioned at the center of an imaging plane of the camera 30. The imaging direction is a normal direction to the imaging plane of the camera 30.

The imaging time $t_p$ is calculated as described below. L represents the distance of travel from velocity measurement time to imaging time and $P_p(x_p, y_p, z_p) = P_p(x_v + L, y_v, z_v)$ represents the imaging position of the vehicle 10. The imaging time $t_p$ is expressed by equation (5).

$$t_p = \frac{L}{v} + t_s = \frac{x_p - x_v}{v} + t_s \tag{5}$$

Step S104

The processing circuit 40 causes the camera 30 to perform an imaging operation in accordance with the control data. Specifically, the processing circuit 40 causes the camera 30 to image the license plate of the vehicle 10 at the imaging time $t_p$ by transmitting the control data to the camera 30 and generate and output captured image data on the license plate. The captured image data incudes captured information on the image 32 of the license plate captured at the imaging time $t_p$. The image represented by the captured image data is the image 32 captured by the camera 30. The captured image 32 is an image where an imaging area is determined by the angle of view ψ of the camera 30. The image includes an image of the license plate of the vehicle 10.

The captured image 32 may be acquired by causing the camera 30 to perform a shutter operation at the imaging time $t_p$. Alternatively, the captured image 32 may be acquired by capturing a video and selecting the image at the imaging time $t_p$ from multiple frames included in the video. Specifically, the processing circuit 40 causes the camera 30 to capture the video of the vehicle 10 and output the captured image data from the video captured by the camera 30. Specifically, the processing circuit 40 transmits the control data including the imaging timing information to the camera 30 and causes the camera 30 to select and acquire the frame at the imaging time $t_p$ from the video. The frame is a still image. If no still image exactly at the imaging time $t_p$ is included in the video, a still image closest to the imaging time $t_p$ may be selected. Such an operation is substantially identical to an operation that causes the camera 30 to capture a still image at the imaging time $t_p$ and generate and output the captured image data.

In the operation of the processing circuit 40 described above, the imaging system 100A of the first embodiment may image the license plate of the vehicle 10 running at a high velocity without framing out the license plate.

Second Embodiment

Figure 5:
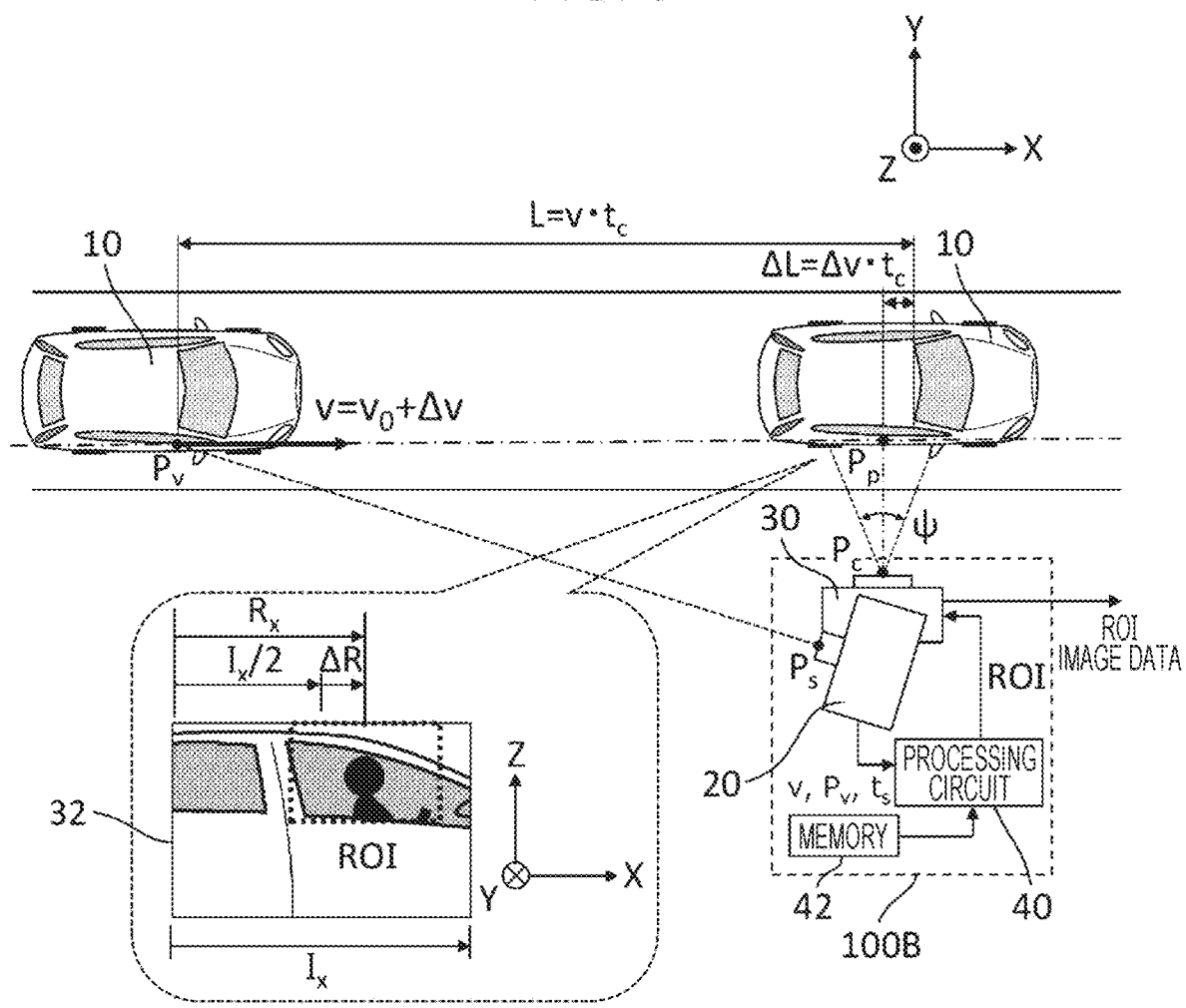
FIG. 5 schematically illustrates a configuration of an imaging system and a positional relationship between the imaging system and a vehicle according to a second exemplary embodiment of the disclosure.

Referring to FIG. 5, a configuration example of an imaging system according to a second embodiment of the disclosure is described below. The discussion of the second embodiment thereafter focuses on the difference from the first embodiment. FIG. 5 schematically illustrates the configuration of the imaging system and the positional relationship between the imaging system and the vehicle according to the second exemplary embodiment of the disclosure. Elements in the imaging system 100B illustrated in FIG. 5 are identical to the elements in the imaging system 100A illustrated in FIG. 1. An imaging target of the second embodiment is a driver or a passenger of the vehicle 10.

The processing circuit 40 in the imaging system 100B causes the sensor 20 to measure the velocity v of the vehicle 10. In accordance with the measurement results, the processing circuit 40 causes the camera 30 to generate the captured image data indicating the captured image 32 by causing the camera 30 to image the vehicle 10 at an appropriate timing. The processing circuit 40 causes the camera 30 to extract an ROI (Region Of Interest) as a portion including an image of the driver or the passenger and generate and output ROI image data. As a result, the driver or the passenger of the vehicle 10 running at a high velocity may be imaged without being framed out of an ROI image illustrated in an enlarged view in FIG. 5. The enlarged view in FIG. 5 indicates the captured image 32. The region enclosed by a broken line in the captured image 32 indicates the ROI.

Figure 6:
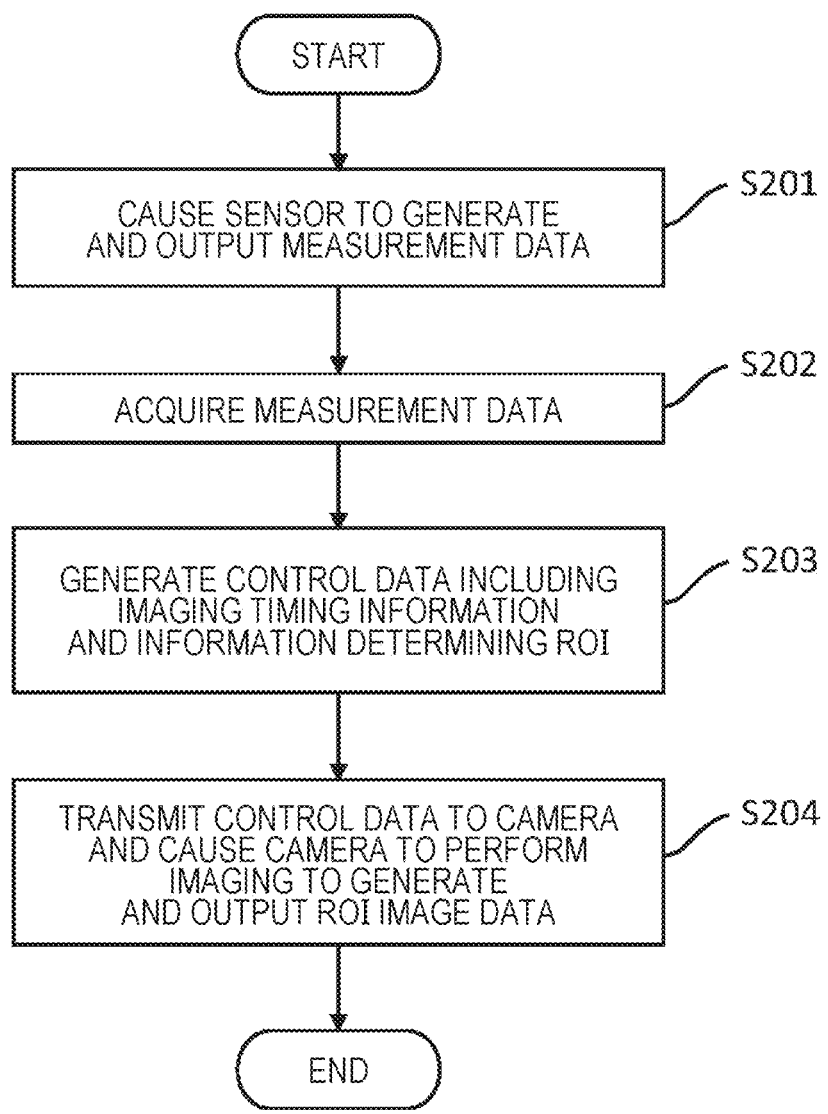
FIG. 6 is a flowchart schematically illustrating an example of an operation performed by a processing circuit of the second embodiment.

An example of the operation performed by the processing circuit 40 of the second embodiment in which the camera 30 images the driver or the passenger of the vehicle 10 at an appropriate timing is described in detail with reference to FIG. 6. FIG. 6 is a flowchart schematically illustrating the example of the operation performed by the processing circuit 40 of the second embodiment. The processing circuit 40 performs operations in step S201 through S204 in FIG. 6.

Steps S201 and S202

Operations in steps S201 and S202 are identical to the operations in steps S101 and S102 in FIG. 4. It is noted, however, that the velocity measurement position $P_v$ of the vehicle 10 is not at the front portion but at the side portion of the vehicle 10.

Step S203

The processing circuit 40 generates control data, including not only the imaging timing information on the imaging time $t_p$ but also information determining ROI included in the captured image 32, in accordance with the information described below. The information serving as a basis of the control data includes (a) position information on the vehicle 10 or distance information on the vehicle 10 at the velocity measurement time, (b) the velocity information on the vehicle 10, (c) the measurement timing information, and (d) information related to the length of ROI described below in each of the X direction and the Z direction.

The imaging position $P_p$ is a position where the driver or the passenger may be imaged at the center of the angle of view of the camera 30. When the vehicle 10 runs in an +X direction, the distance of travel L of the vehicle 10 after the elapse of a specific time $t_c$ from the measurement time $t_s$ is represented by $L=v \cdot t_c$. The imaging time is $t_p, t_s+t_c$.

When the camera 30 performs an imaging operation at the imaging time $t_p$, the velocity of the vehicle 10 with the driver or the passenger at the center of the captured image 32 is set to be a reference velocity $v_0$. Moreover, the velocity v of the vehicle 10 is set to be different from the reference velocity $v_0$ by $\Delta v$. This signifies that $v=v_0+\Delta v$. In this case, the distance of travel L of the vehicle 10 is $L=(v_0+\Delta v) \cdot t_c$ and an amount of deviation $\Delta L$ in the distance of travel is $\Delta L = \Delta v \cdot t_c$ in comparison with the case where the velocity of the vehicle 10 is $v_0$.

In comparison with the case where the velocity of the vehicle 10 is $v_0$, an amount of deviation $\Delta R$ in the image of the driver or the passenger in the captured image 32 is $\Delta R = \alpha \cdot \Delta L$. It is noted that $\alpha$ is a coefficient corresponding to the angle of view of the camera 30. The value of the coefficient $\alpha$ is larger as the angle of view of the camera 30 is smaller. If $I_x$ represents the number of pixels in the X direction of the captured image 32, the center coordinate $R_x$ in the X direction of the ROI in the example of the enlarged view in FIG. 5A is represented by the following equation (6).

$$R_x = \frac{I_x}{2} + \Delta R = \frac{I_x}{2} + \alpha \cdot \Delta L = \frac{I_x}{2} + \alpha \cdot \Delta v \cdot t_c = \frac{I_x}{2} + \alpha \cdot (v - v_0) \cdot t_c \quad (6)$$

The length of the ROI in the X direction may be, for example, half the length of the captured image 32 in the X direction. The center coordinate $R_x$ and the length of the ROI in the X direction determine a coordinate range of the ROI in the X direction. The coordinate range of the ROI in the Z direction may be, for example, an upper half of the captured image 32 in the Z direction.

Step S204

The processing circuit 40 transmits the control data to the camera 30 and causes the camera 30 to image the driver or the passenger of the vehicle 10 at the imaging time $t_p$ and generate and output the ROI image data. The ROI image data includes ROI image information related to an image of the ROI. Specifically, the processing circuit 40 causes the camera 30 to generate the captured image data on the driver or the passenger, extract the ROI from the captured image 32 indicated by the captured image data, and generate and output the ROI image data. The image indicated by the ROI image data is an image of the extracted ROI. The image includes an image of the driver or the passenger of the vehicle 10.

Figure 7A:
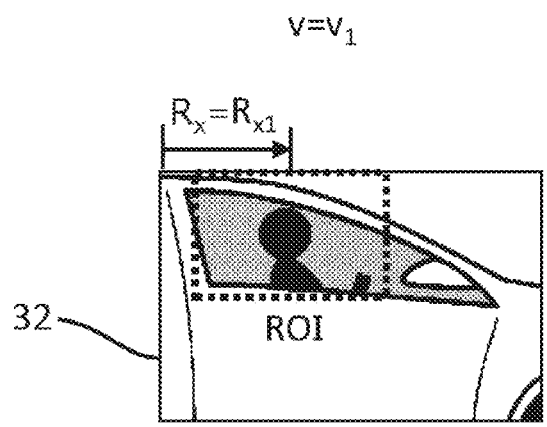
FIG. 7A illustrates a positional relationship between a captured image and an ROI when the velocity of a vehicle is $v_1$.
Figure 7B:
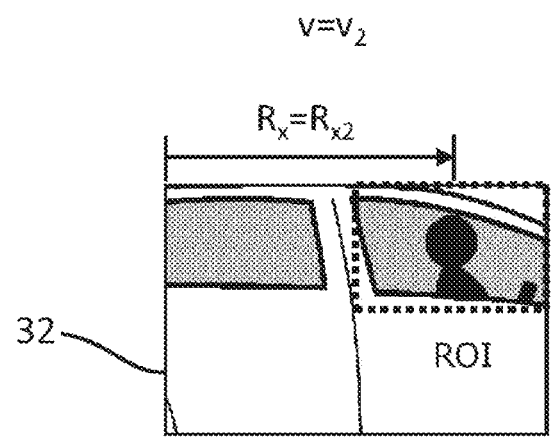
FIG. 7B illustrates a positional relationship between the captured image and the ROI when the velocity of the vehicle is $v_2$.

How the positional relationship between the captured image 32 and the ROI depends on the velocity v of the vehicle 10 is described with reference to FIG. 7A and FIG. 7B. FIG. 7A and FIG. 7B illustrate the positional relationship between the captured image 32 and the ROI when the velocities v of the vehicle 10 are $v_1$ or $v_2$, respectively. The velocity $v_1$ is lower than the reference velocity $v_0$ and the velocity $v_2$ is higher than the reference velocity $v_0$.

If the velocity $v_1$ is lower than the reference velocity $v_0$, the image of the driver is shifted leftward in the captured image 32 as illustrated in FIG. 7A. In contrast, if the velocity $v_2$ is higher than the reference velocity $v_0$, the image of the driver is shifted rightward in the captured image 32 as illustrated in FIG. 7B. Let $R_{x1}$ represent the center coordinate of the ROI in the X direction with respect to the velocity $v_1$ and $R_{x2}$ represent the center coordinate of the ROI in the X direction with respect to the velocity $v_2$, and relationship $R_{x1} < R_{x2}$ holds true if $v_1 < v_2$. In other words, the ROI is shifted more rightward in the captured image 32 as the velocity v of the vehicle 10 is higher.

In the operation of the processing circuit 40 described above, the imaging system 100B of the second embodiment may image the driver or the passenger of the vehicle 10 running at a high velocity without framing out the driver or the passenger from the image of the ROI.

Third Embodiment

Figure 8:
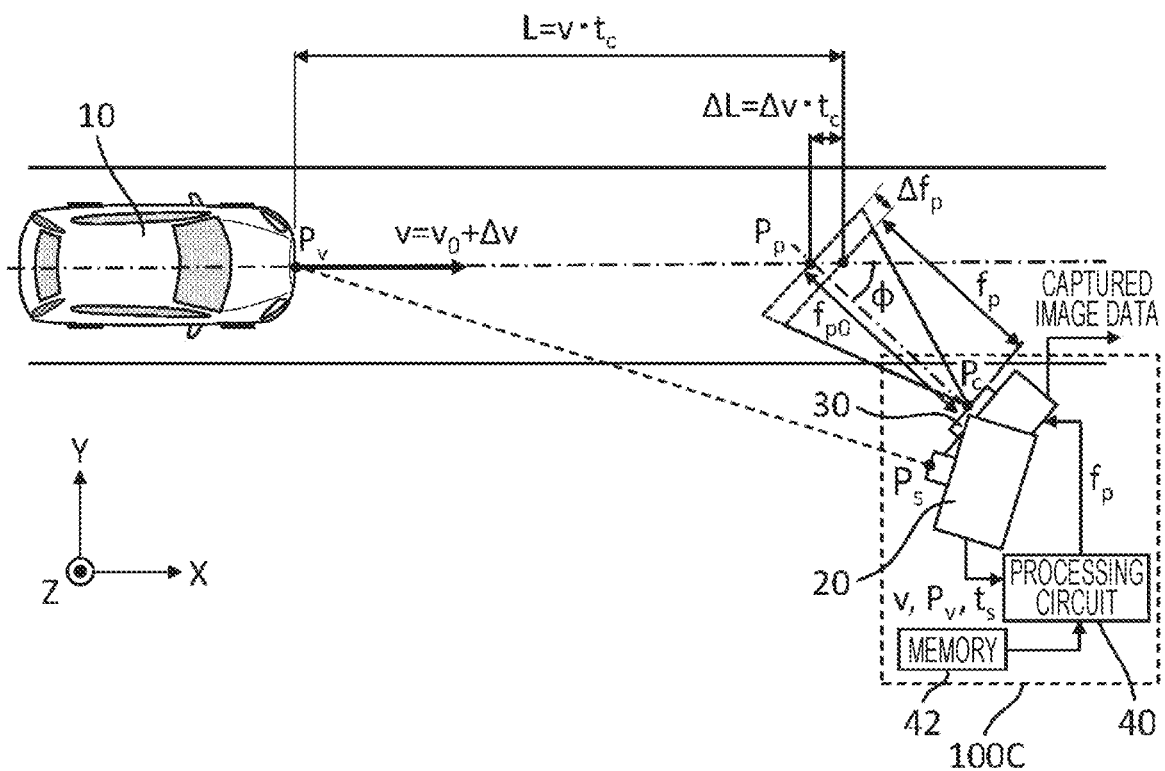
FIG. 8 schematically illustrates a configuration of an imaging system and a positional relationship between the imaging system and a vehicle according to a third exemplary embodiment of the disclosure.

Referring to FIG. 8, a configuration example of an imaging system according to a third embodiment of the disclosure is described below. FIG. 8 schematically illustrates the configuration of the imaging system and the positional relationship between the imaging system and the vehicle according to the third exemplary embodiment of the disclosure. Elements in the imaging system 100C illustrated in FIG. 8 are identical to the elements in the imaging system 100A illustrated in FIG. 1. It is noted, however, that the camera 30 includes an unillustrated optical system enabled to adjust a focus position. The imaging target in the third embodiment is the license plate of the vehicle 10.

The processing circuit 40 in the imaging system 100C causes the sensor 20 to measure the velocity v of the vehicle 10 and determines a focus position $f_p$ of the camera 30 in accordance with the measurement results. The processing circuit 40 causes the camera 30 to adjust a focus position in accordance with the determined focus position $f_p$, then image the license plate of the vehicle 10 at an appropriate timing, and generate and output the captured image data. As a result, the license plate of the vehicle 10 running at a high velocity may thus be imaged clearly without being framed out.

Figure 9:
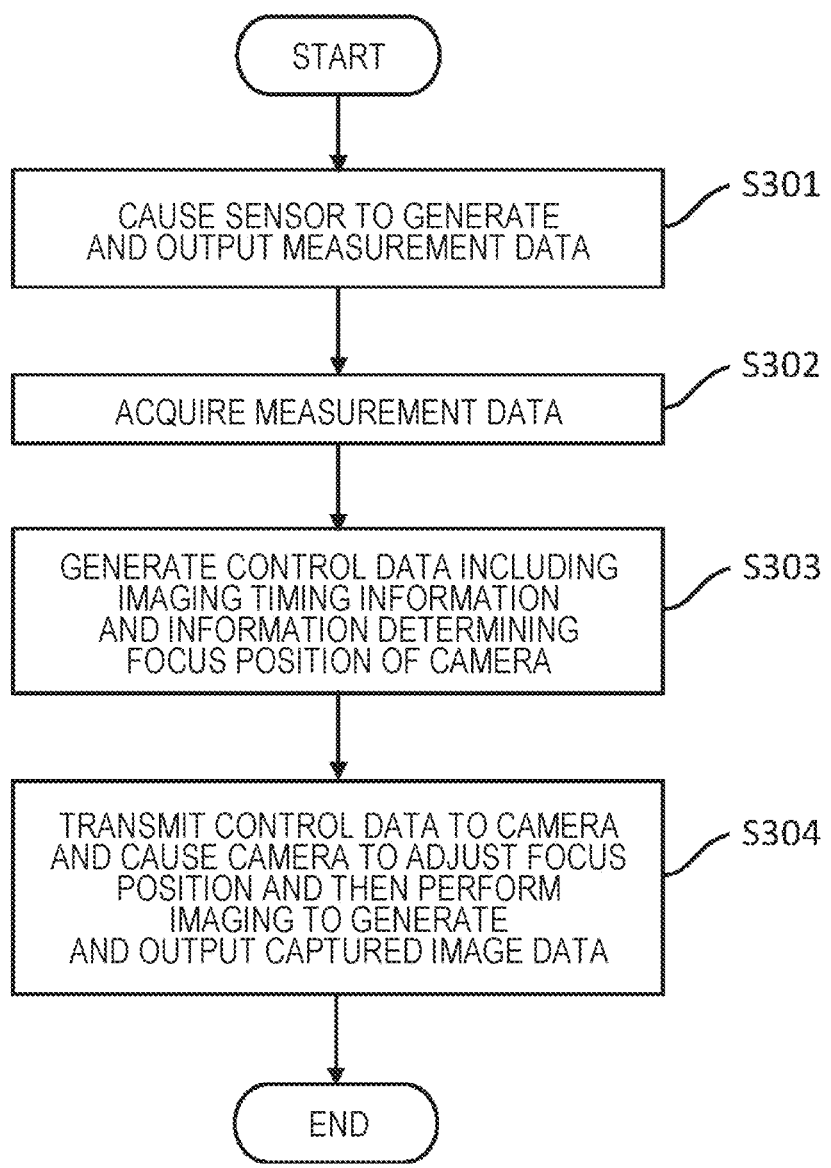
FIG. 9 is a flowchart schematically illustrating an example of an operation performed by a processing circuit of the third embodiment.

The operation performed by the processing circuit 40 of the third embodiment in which the camera 30 images the license plate of the vehicle 10 at an appropriate timing is described in detail with reference to FIG. 9. FIG. 9 is a flowchart schematically illustrating an example of the operation performed by the processing circuit 40 of the third embodiment. The processing circuit 40 performs operations in steps S301 through S304 illustrated in FIG. 9.

Steps S301 and S302

Operations in steps S301 and S302 are identical to the operations in steps S101 and S102 in FIG. 4.

Step S303

The processing circuit 40 generates control data, including not only imaging timing information on the imaging time $t_p$ but also information determining the focus position $f_p$ of the camera 30, in accordance with the information described below. The information serving as a basis of the control data includes (a) position information on the vehicle 10 or distance information on the vehicle 10 at the velocity measurement time, (b) the velocity information on the vehicle 10, and (c) the measurement timing information.

The imaging position $P_p$ is a position that allows the license plate to be imaged at the center of the angle of view of the camera 30. When the vehicle 10 is running in the +X direction, the distance of travel L of the vehicle 10 after the elapse of a specific time $t_c$ from the measurement time $t_s$ is represented by $L=v \cdot t_c$. The imaging time is $t_p=t_s+t_c$.

When the camera 30 performs an imaging operation at the imaging time $t_p$, the velocity of the vehicle 10 with the image the license plate positioned at the center of the captured image 32 is set to be the reference velocity $v_0$. Moreover, the velocity v of the vehicle 10 may be different from the reference velocity $v_0$ by $\Delta v$. This signifies $v=v_0+\Delta v$. In this case, the distance of travel L of the vehicle 10 is $L=(v_0+\Delta v) \cdot t_c$ and an amount of deviation $\Delta L$ in the distance of travel is represented by $\Delta L=\Delta v \cdot t_c$ in comparison with the case where the velocity of the vehicle 10 is $v_0$.

In comparison with the case where the velocity of the vehicle 10 is $v_0$, an amount of deviation $\Delta f_p$ in the focus position is $\Delta f_p=\Delta L \cdot \cos \varphi$. Herein $\varphi$ is an angle between the running direction of the vehicle 10 and the direction opposite to the imaging direction of the camera 30. Let $f_{p0}$ represent a focusing distance with the velocity of the vehicle 10 being $v_0$, and the focusing distance $f_p$ in the example illustrated in FIG. 8 is represented by the following equation (7). The focusing distance $f_{p0}$ is represented by a distance from the camera position $P_c$ to the imaging position $P_p$.

$$f_p = f_{p0} - \Delta f_p = f_{p0} - \Delta L \cdot \cos \varphi = f_{p0} - \Delta v \cdot t_c \cdot \cos \varphi = f_{p0} - (v-v_0) \cdot t_c \cdot \cos \varphi \quad (7)$$

Step S304

The processing circuit 40 transmits the control data to the camera 30 and causes the camera 30 to adjust the focusing distance to $f_p$ with an unillustrated optical system such that the focus position is $f_p$, then image the license plate of the vehicle 10 at the imaging time $t_p$, and generate and output the captured image data. The license plate of the vehicle 10 is preset at the focus position of the camera 30.

In the operation of the processing circuit 40 described above, the imaging system 100C of the third embodiment may image clearly the license plate of the vehicle 10 running at a high velocity without framing out the license plate.

The camera 30 may include an optical system that is enabled to adjust an opening and closing degree of aperture.

The control data in step S303 may further include information that determines the opening and closing degree of aperture of the camera 30. The processing circuit 40 transmits the control data to the camera 30 and causes the camera 30 to vary the opening and closing degree of aperture. Since the imaging system 100C of the third embodiment accurately determines the focus position, the image of the license plate is not blurred if the focal depth of the optical system becomes shallower with the aperture of the camera 30 opened. As a result, a high S/N ratio image may result even at night when ambient light is at a lower level.

The camera 30 may adjust exposure time in response to the opening and closing degree of aperture. The control data in step S303 may further include information determining the exposure time of the camera 30. The processing circuit 40 transmits the control data to the camera 30 and causes the camera 30 to adjust the exposure time. The exposure time is adjusted such that a desired amount of light is acquired in response to the opening and closing degree of aperture. The control data may not necessarily include the information determining the exposure time and the camera 30 may adjust the exposure time in response to the opening and closing degree of aperture.

The control data in step S303 may include not only the imaging timing information but also at least one piece of information determining the focus position $f_p$ of the camera 30, information determining the opening and closing degree of aperture of the camera 30, and information determining the exposure time of the camera 30.

Fourth Embodiment

Figure 10:
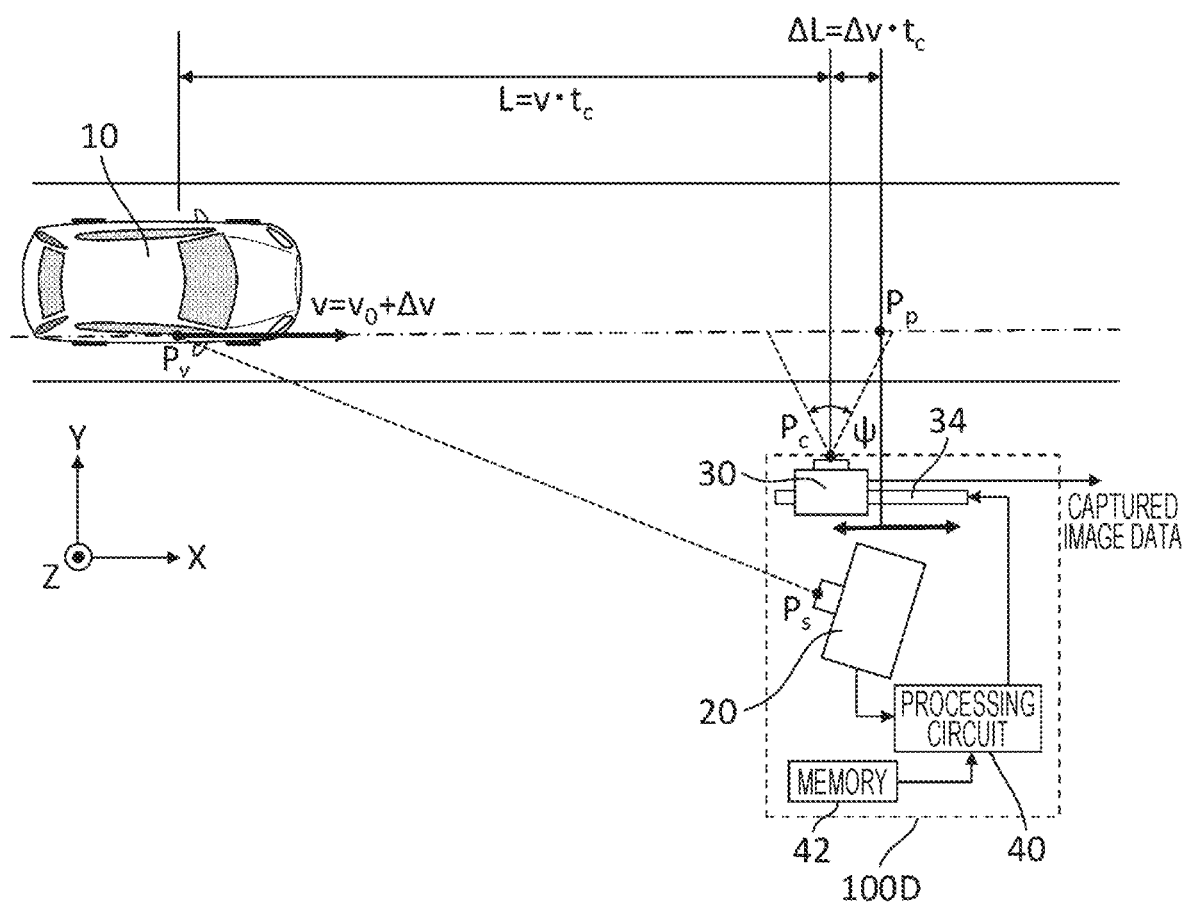
FIG. 10 schematically illustrates a configuration of an imaging system and a positional relationship between the imaging system and a vehicle according to a fourth exemplary embodiment of the disclosure.

A configuration of an imaging system of a fourth embodiment of the disclosure is described below with reference to FIG. 10. FIG. 10 schematically illustrates the configuration of the imaging system and the positional relationship between the imaging system and the vehicle according to the fourth exemplary embodiment of the disclosure. The imaging system 100D in FIG. 10 is different from the imaging system 100A in FIG. 1 in that the camera 30 further includes an actuator 34 that moves the camera 30 in the X direction in parallel displacement. The actuator 34 may move the camera 30 in parallel displacement in a direction different from the X direction. The imaging target of the fourth embodiment is the driver or the passenger of the vehicle 10.

The processing circuit 40 in the imaging system 100D causes the sensor 20 to measure the velocity v of the vehicle 10. In response to the measurement results, the processing circuit 40 causes the camera 30 to move in position in the X direction in parallel displacement with the actuator 34 and then causes the camera 30 to image the vehicle 10 at an appropriate timing and generate and output the captured image data. As a result, the driver or the passenger of the vehicle 10 running at a high velocity may be reliably imaged without being framed out.

Figure 11:
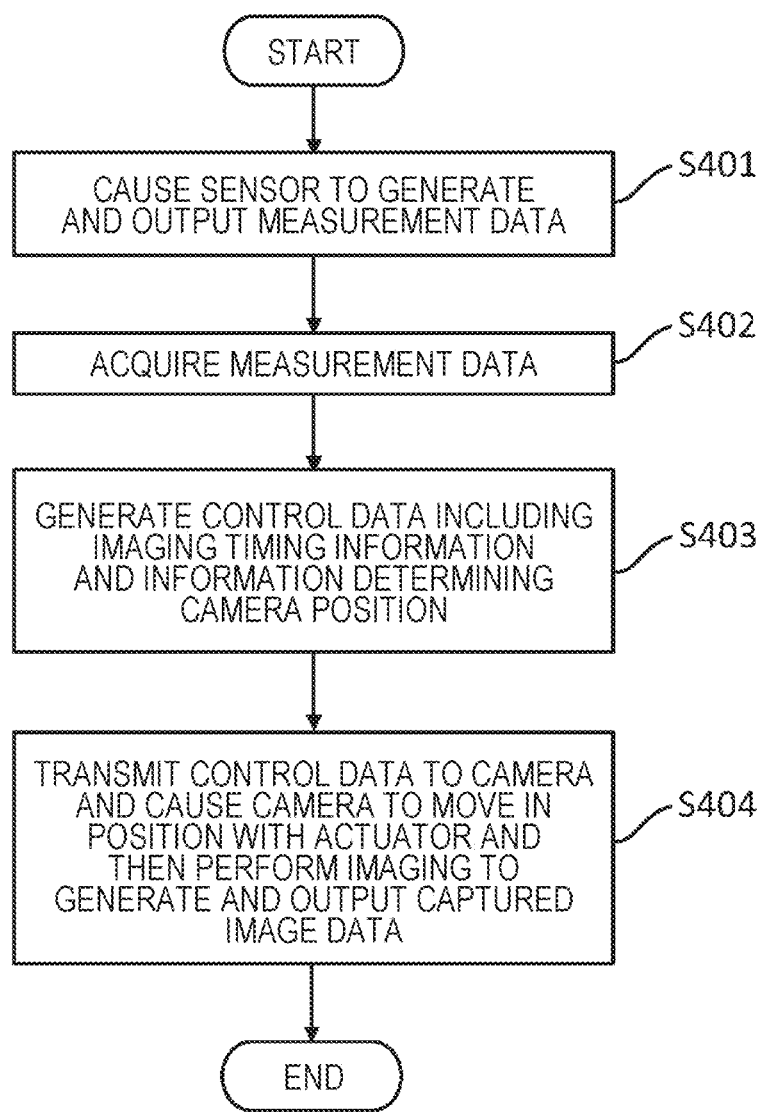
FIG. 11 is a flowchart schematically illustrating an example of an operation performed by a processing circuit of the fourth embodiment.

The example of the operation performed by the processing circuit 40 of the fourth embodiment in which the camera 30 images the driver or the passenger of the vehicle 10 is described in detail with reference to FIG. 11. FIG. 11 is a flowchart schematically illustrating the example of the operation performed by the processing circuit 40 of the fourth embodiment. The processing circuit 40 performs operations in steps S401 through S404 illustrated in FIG. 11.

Steps S401 and S402

Operations in steps S401 and S402 are identical to the operations in steps S101 and S102 illustrated in FIG. 4. It is noted, however, that the velocity measurement position $P_v$ of the vehicle 10 is not at the front portion of the vehicle 10 but at the side portion of the vehicle 10.

Step S403

The processing circuit 40 generates control data, including not only the imaging timing information on the imaging time $t_p$ but also information determining the camera position $P_c$ of the camera 30, in accordance with the information described below. The information serving as a basis of the control data includes (a) position information on the vehicle 10 or distance information on the vehicle 10 at the velocity measurement time, (b) the velocity information on the vehicle 10, (c) the measurement timing information, and (d) information on a movable range of the camera 30 described below.

When the camera 30 is positioned at the center of the movable range thereof, the imaging position $P_p$ is a position where the driver or the passenger is imaged at the center of the angle of view of the camera 30. If the vehicle 10 runs in the +X direction, the distance of travel L of the vehicle 10 traveled after the time elapse of the specific time $t_c$ from the measurement time $t_s$ is represented by $L = v \cdot t_c$. The imaging time is $t_p$, $t_s + t_c$.

When the camera 30 performs the imaging operation at the imaging time $t_p$, the velocity of the vehicle 10 with the driver or the passenger at the center of the captured image 32 is set to be a reference velocity $v_0$. Moreover, the velocity v of the vehicle 10 is set to be different from the reference velocity $v_0$ by $\Delta v$. This signifies that $v = v_0 + \Delta v$. In this case, the distance of travel L of the vehicle 10 is $L = (v_0 + \Delta v) \cdot t_c$ and an amount of deviation in the distance of travel L is $\Delta L = \Delta v \cdot t_c$ in comparison with the case where the speed of the vehicle 10 is $v_0$. Since the directions of travel of the vehicle 10 and the actuator 34 are identical to each other, the deviation in the position of the actuator 34 is $\Delta L$ in comparison with the case where the velocity of the vehicle 10 is $v_0$. The camera position $P_c$ is represented by the following equation (8).

$$P_c = \frac{M_{x1} + M_{x2}}{2} + \Delta L = \frac{M_{x1} + M_{x2}}{2} + \Delta v \cdot t_c = \frac{M_{x1} + M_{x2}}{2} + (v - v_0) \cdot t_c \quad (8)$$

Herein, $M_{x1}$ and $M_{x2}$ respectively represent coordinates of the left end and the right end of the range of movement of the camera.

Step S404

The processing circuit 40 transmits the control data to the camera 30 and causes the camera 30 to move in position to the camera position $P_c$ with the actuator 34 and then causes the camera 30 to image the driver or the passenger of the vehicle 10 at the imaging time $t_p$ and generate and output the captured image data.

In the operation of the processing circuit 40 described above, the imaging system 100D of the fourth embodiment may more reliably image the license plate of the vehicle 10 running at a high velocity without framing out the license plate.

The camera 30 may include an actuator that varies the orientation of the camera 30 through a pan rotation and/or a tilt rotation. The pan rotation signifies rotation around the Z axis serving as an axis of rotation and the tilt rogation signifies rotation around the X axis serving as an axis of rotation. The control data in step S403 may further include information determining the angles of rotation of the pan rotation and/or the tilt rotation of the camera 30. The processing circuit 40 transmits the control data to the camera 30 and thus causes the camera 30 to vary the orientation of the camera 30 with the actuator.

The camera 30 may further include an actuator that varies a zoom magnification of the camera 30. The control data in step S403 may further include information determining the zoom magnification of the camera 30. The processing circuit 40 transmits the control data to the camera 30 and then causes the camera 30 to vary the zoom magnification of the camera 30 with the actuator. If the zoom magnification of the camera 30 is set to be lower as the camera 30 is farther away from the imaging position $P_p$, the driver or the passenger of the vehicle 10 running at a high velocity may be imaged without being framed out.

The control data in step S403 may further include not only the imaging timing information but also at least one piece of information determining the camera position $P_c$ of the camera 30, information determining the angles of rotation of the pan rotation and/or the tilt rotation of the camera 30, and information determining the zoom magnification of the camera 30.

Fifth Embodiment

Figure 12:
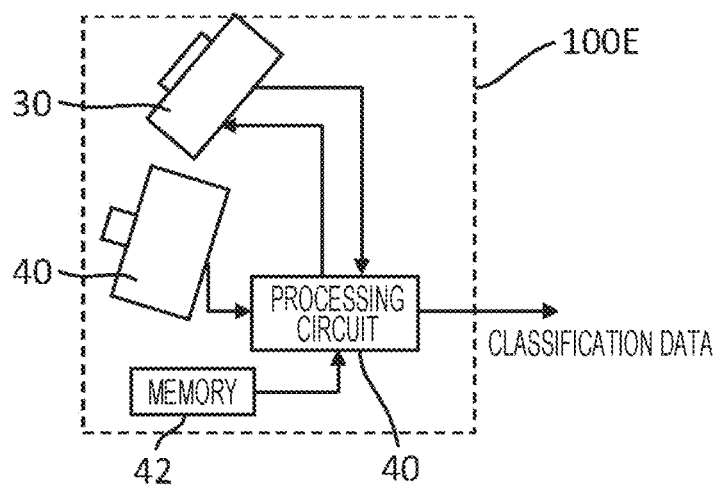
FIG. 12 schematically illustrates a configuration of an imaging system of a fifth exemplary embodiment of the disclosure.

Referring to FIG. 12, a configuration example of the imaging system of a fifth embodiment of the disclosure is described below. FIG. 12 schematically illustrates the configuration of the imaging system of the fifth exemplary embodiment of the disclosure. Elements in an imaging system 100E illustrated in FIG. 12 are identical to the elements in the imaging system 100A illustrated in FIG. 1. The imaging system 100E in FIG. 12 acquires the captured image data from the camera 30, analyzes the captured image data and generates and outputs classification data including classification information on the vehicle 10. For example, the analysis of the captured image data signifies reading the license plate. For example, the classification information on the vehicle 10 may be related to vehicle model, vehicle classification and toll. The imaging system 100E of the fifth embodiment may acquire, at a high accuracy, information on the vehicle 10. It may be accepted that an object other the vehicle 10 is imaged.

Sixth Embodiment

A velocity measurement example of an imaging system of a sixth embodiment of the disclosure is described below with reference to FIG. 13A through FIG. 13C. Elements in the imaging system of the sixth embodiment of the disclosure are identical to the elements in one of the first to fifth embodiments. In the first to fifth embodiments, an irradiation position of the irradiation light 20L$_2$ is designed to be higher than the highest point of a wheel of the vehicle 10 and lower than the highest point of the vehicle 10 with respect to the road surface. The vehicle body of the vehicle 10 is irradiated with the irradiation light 20L$_2$ while the wheels are not irradiated with the irradiation light 20L$_2$. According to the sixth embodiment, in contrast, the irradiation position of the irradiation light 20L$_2$ is designed to be lower than the highest point of the wheel and higher than the lowest point of the vehicle body. This allows not only the vehicle body of the vehicle 10 but also the wheel of the vehicle 10 to be irradiated with the irradiation light 20L$_2$.

Figure 13A:
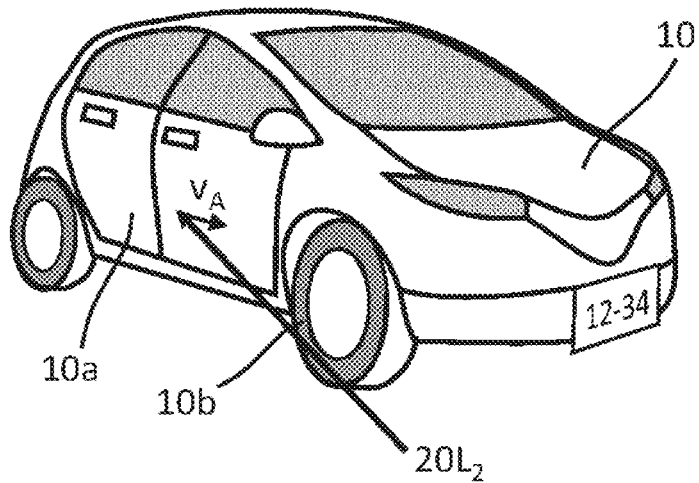
FIG. 13A is a perspective view schematically illustrating how a body of the vehicle is irradiated with irradiation light in an imaging system of a sixth embodiment.
Figure 13B:
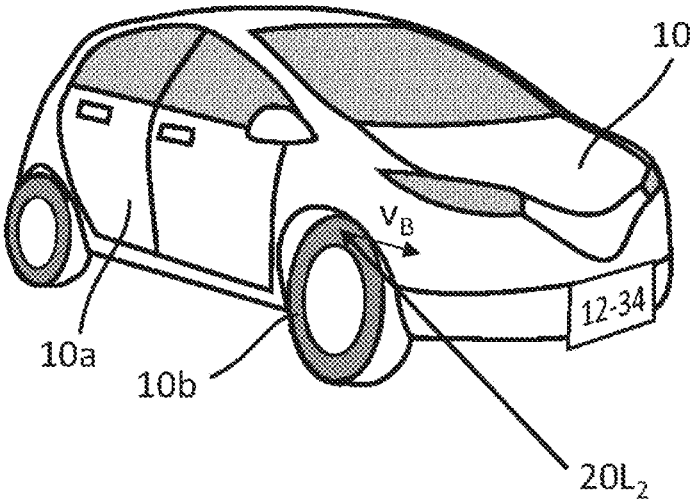
FIG. 13B is a perspective view schematically illustrating how the body of the vehicle is irradiated with the irradiation light in the imaging system of the sixth embodiment.

Each of FIG. 13A and FIG. 13B is a perspective view that illustrates how the vehicle body and the wheel of the vehicle 10 are irradiated with the irradiation light 20L$_2$ in the imaging system of the sixth embodiment. The vehicle 10 illustrated in FIG. 13A and FIG. 13B includes a vehicle body 10*a* and four wheels 10*b*. As illustrated in FIG. 13A, a velocity $v_A$ of the vehicle body 10*a* of the vehicle 10 may be measured by irradiating the vehicle body 10*a* with the irradiation light 20L$_2$. The velocity $v_A$ of the vehicle body 10*a* is a running velocity of the vehicle 10. Referring to FIG. 13B, a velocity $v_B$ as a combination of the velocity of the vehicle body 10*a* and a rotating velocity of the wheel 10*b* may be measured by irradiating the wheel 10*b* of the vehicle 10 with the irradiation light 20L$_2$. Velocity information included in the measurement data output from the sensor 20 is information related to the velocity of the vehicle body 10*a* and the rotating velocity of the wheel 10*b*.

Figure 13C:
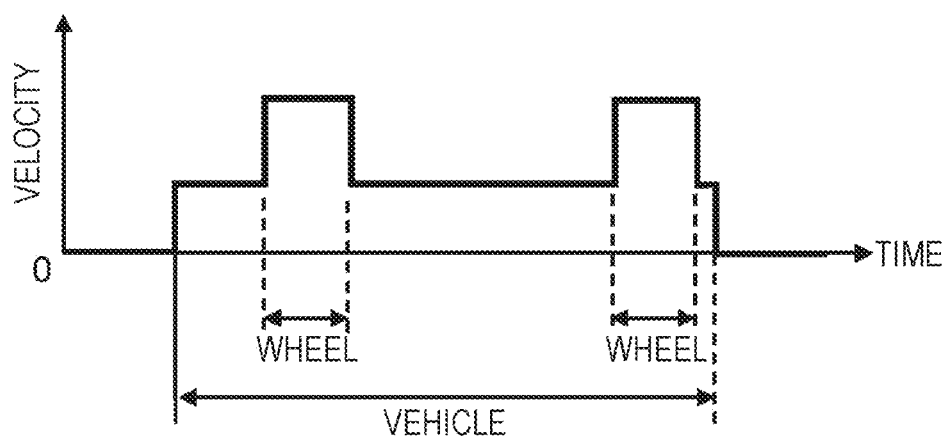
FIG. 13C is a graph illustrating a time variation in measured velocity.

FIG. 13C is a graph illustrating a time variation in the measurement velocity. In a period of time while the measurement velocity is non-zero, the vehicle 10 is irradiated with the irradiation light 20L$_2$. The measurement velocity for the non-zero period is not constant but indicates two different velocity values. For the period of time with a relatively lower measurement velocity, the vehicle body 10*a* of the vehicle 10 is irradiated with the irradiation light 20L$_2$. For the period of time with a relatively higher measurement velocity, the wheel 10*b* of the vehicle 10 is irradiated with the irradiation light 20L$_2$. By analyzing the time variation in the measurement velocity, information related to the length of the vehicle 10 and the axle count of the vehicle may be acquired and the vehicle model and/or the vehicle classification may be accurately determined. In the example illustrated in FIG. 13C, the length of the vehicle may be calculated by multiplying the velocity v of the vehicle 10 by a width of the period of time with the non-zero measurement velocity. The axle count of the vehicle 10 may be determined by the number of time periods indicating a relatively higher measurement velocity. In the example illustrated in FIG. 13C, the axle count of the vehicle 10 is 2.

The operation of the processing circuit 40 of the sixth embodiment is described below. The processing circuit 40 acquires the measurement data and generates axle count data, including axle count information on the vehicle 10, in accordance with the velocity information included in the measurement data. The processing circuit 40 further generates and outputs vehicle model data, including vehicle model information on the vehicle 10, in accordance with the axle count information included in the axle count data and captured image information included in the captured image data. The vehicle model information is information related to the vehicle model of the vehicle 10.

ETC as Combination of Fifth and Sixth Embodiments

It is expected in the future that ETC is demanded to perform an operation described below to complement information not acquired by a vehicle detector or an axle detector or to control unauthorized driving. The operation incudes imaging the vehicle 10 with the camera 30, acquiring information on the vehicle model or the driver in accordance with the image of the license plate or the image of the face of the driver included in the captured image, and linking the information with information acquired by the vehicle detector or the axle detector. Combining the fifth and sixth embodiments may lead to an ETC that satisfies the expectation.

Figure 14:
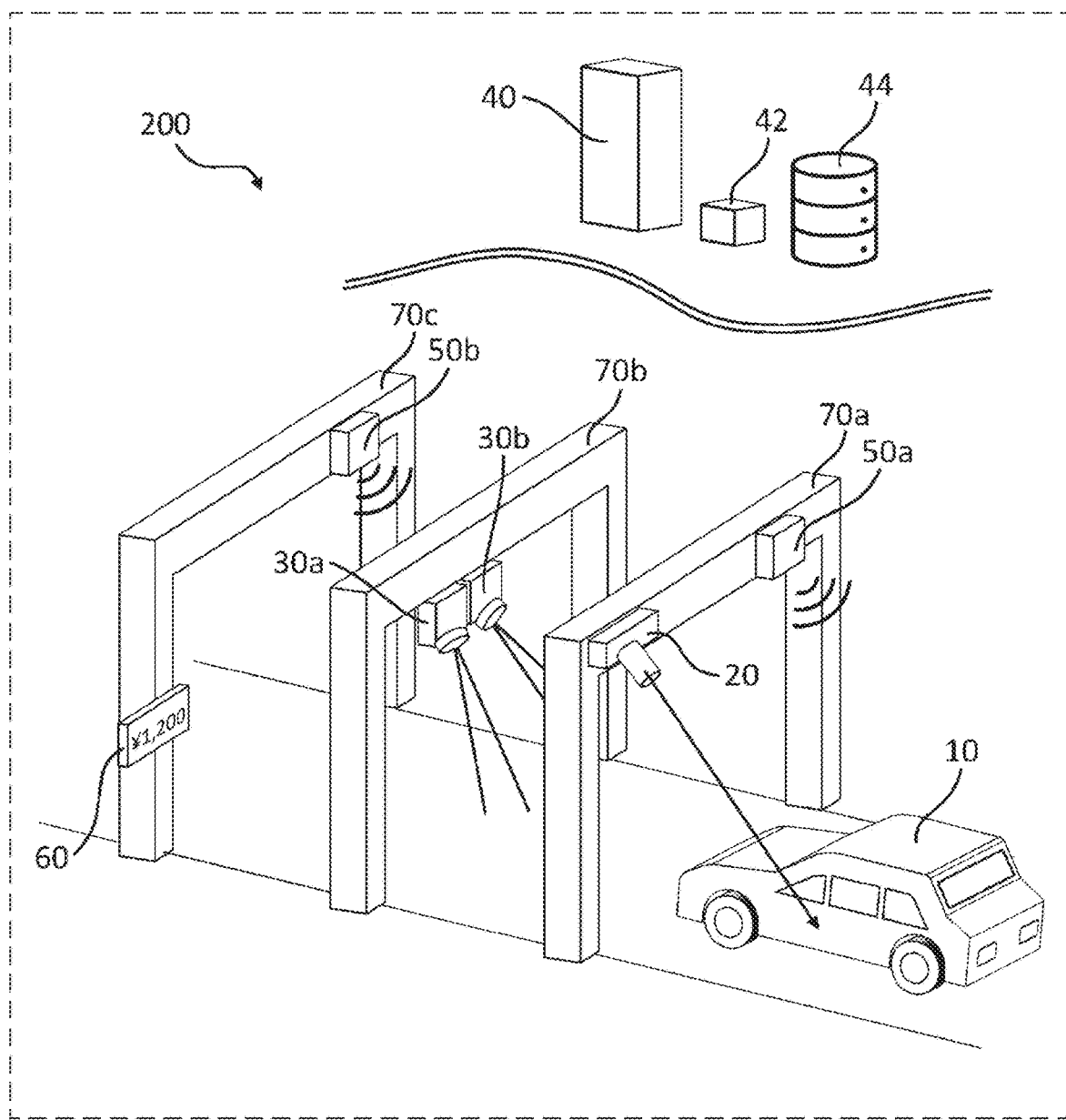
FIG. 14 schematically illustrates a configuration example of ETC serving as a combination of the fifth and the sixth embodiments.

The configuration example of the ETC including the combination of the fifth and sixth embodiments is described below with reference to FIG. 14. FIG. 14 schematically illustrates the configuration example of the ETC including the combination of the fifth and sixth embodiments. The ETC 200 illustrated in FIG. 14 includes a sensor 20, a first camera 30*a*, a second camera 30*b*, a first radio device 50*a*, a second radio device 50*b*, and a display device 60. The ETC 200 includes a first gate 70*a*, a second gate 70*b*, and a third gate 70*c* in this order in the running direction of the vehicle 10. The first gate 70*a* supports the sensor 20 and the first radio device 50*a*. The second gate 70*b* supports the first camera 30*a* and the second camera 30*b*. The third gate 70*c* supports the second radio device 50*b*. The ETC 200 includes a processing circuit 40, a memory 42 and a storage device 44, all mounted spaced away from the elements described above.

The sensor 20 measures the velocity v and the velocity measurement position $P_v$ of the vehicle 10. The sensor 20 may acquire information determining the length and the axle count of the vehicle. The first camera 30*a* images the license plate of the vehicle 10 and the second camera 30*b* images the driver of the vehicle 10. In place of the first and second cameras 30*a* and 30*b*, a single camera enabled to vary the orientation thereof may image the license plate and the driver of the vehicle 10 at different timings. The first radio device 50*a* and the second radio device 50*b* communicate with an ETC vehicular device of the vehicle 10. The ETC vehicular device stores data including travel section information and fee classification information. The display device 60 displays fee information, such as expressway toll, to the driver of the vehicle 10.

The processing circuit 40 controls of an operation of the sensor 20, the first camera 30*a*, the second camera 30*b*, the first radio device 50*a*, the second radio device 50*b*, and the display device 60. The processing circuit 40 processes data output from the sensor 20, the first camera 30*a* and the second camera 30*b*. In accordance with the operation results, the processing circuit 40 causes the storage device 44 to store information on a vehicle 10 that is suspected of unauthorized driving.

Figure 15:
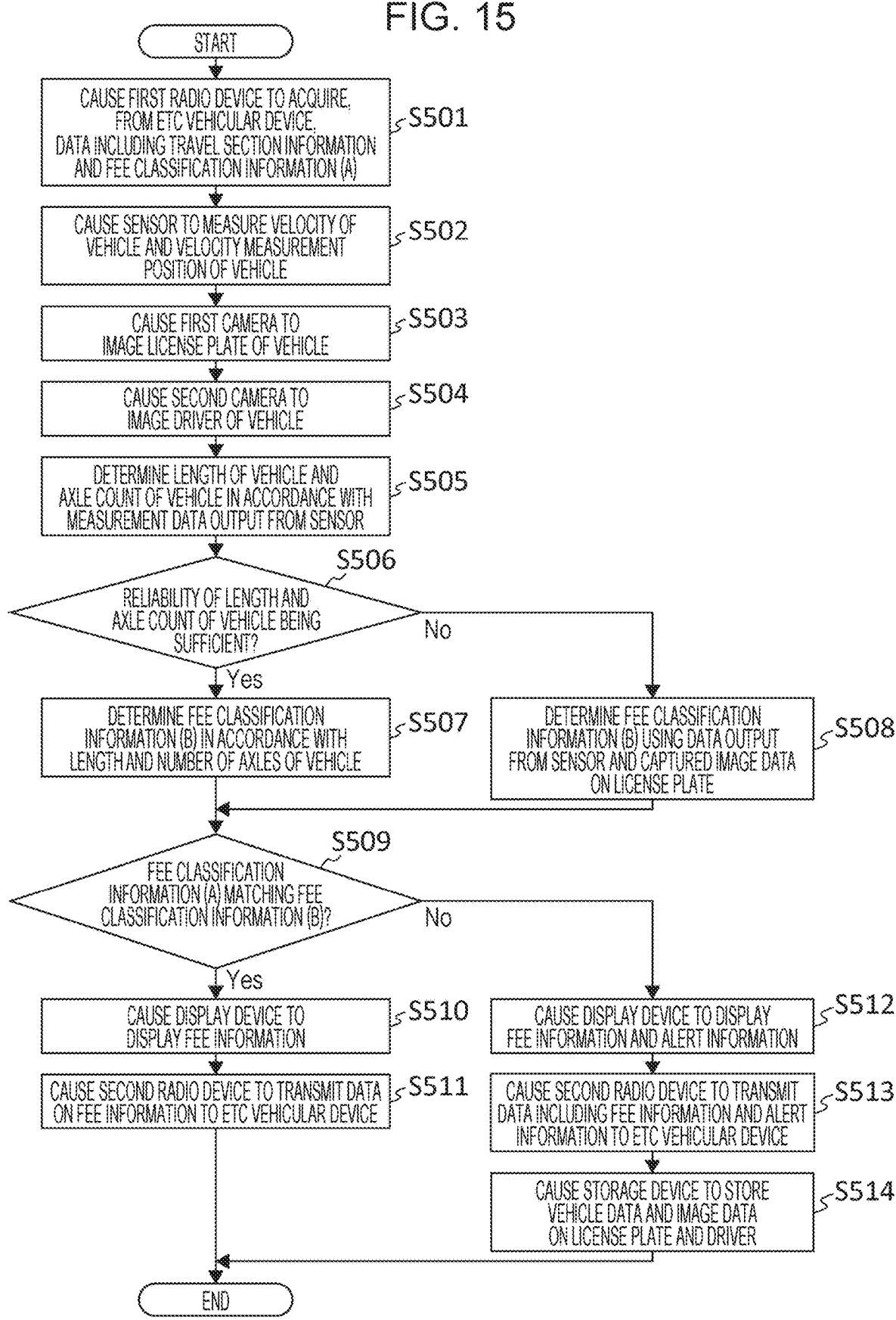
FIG. 15 is a flowchart schematically illustrating an example of an operation performed by a processing circuit in the ETC illustrated in FIG. 14.

The operation performed by the processing circuit 40 in the ETC 200 illustrated in FIG. 14 is described in detail next below. FIG. 15 is a flowchart schematically illustrating an example of the operation performed by the processing circuit 40 in the ETC 200 illustrated in FIG. 14. The processing circuit 40 performs operations in steps S501 through S514 illustrated in FIG. 15.

Step S501

The processing circuit 40 causes the first radio device 50*a* to communicate with the ETC vehicular device mounted on the vehicle 10 and acquire the data including the travel section information and the fee classification information on the vehicle 10 stored on the ETC vehicular device mounted on the vehicle 10. For convenience of explanation, the fee classification information is referred to as fee classification information (A).

Step S502

The processing circuit 40 causes the sensor 20 to measure the velocity v and the velocity measurement position $P_v$ of the vehicle 10 and generate and output the measurement data. The processing circuit 40 acquires the measurement data.

Step S503

The processing circuit 40 causes the first camera 30*a* to image the license plate of the vehicle 10 and generate and output the captured image data on the license plate. The processing circuit 40 acquires the captured image data.

Step S504

The processing circuit 40 causes the second camera 30*b* to image the driver of the vehicle 10 and generate and output the captured image data on the driver. The processing circuit 40 acquires the captured image data.

Step S505

The processing circuit 40 determines the length and the axle count of the vehicle 10 in accordance with the measurement data output from the sensor 20.

Step S506

The processing circuit 40 determines whether the reliability of the determined length and axle count of the vehicle 10 is sufficient. For example, environmental factors, such as raining or thick fog, may cause S/N ratio of reflection light reflected from the vehicle 10 to be lower than a predetermined threshold and at least part of the measurement data output from the sensor 20 may be missing. In such a case, the processing circuit 40 determines that the reliability is not sufficient. In another case, if the determined length of the vehicle 10 is unrealistic, for example, 10 m or longer, or if the axle count is unrealistic, for example, 10 or more, the processing circuit 40 determines that the reliability is not sufficient. If the determination is yes, the processing circuit 40 performs an operation in step S507. If the determination is no, the processing circuit 40 performs an operation in step S508.

Step S507

The processing circuit 40 determines the fee classification information in accordance with the information on the length of the vehicle and the axle count. For convenience of explanation, this information is referred to as fee classification information (B).

Step S508

The processing circuit 40 determines the fee classification information (B) using information included in the measurement data output from the sensor 20 and the captured image data on the license plate. For example, information included in the captured image data is character information on the license plate.

Step S509

The processing circuit 40 compares the fee classification information (A) with the fee classification information (B) to determine whether the two pieces of the information match each other. If the determination is yes, the processing circuit 40 performs an operation in step S510. If the determination is no, the processing circuit 40 performs an operation in step S512.

Step S510

The processing circuit 40 causes the display device 60 to display the fee information that is based on the fee classification information and the travel section information.

Step S511

The processing circuit 40 causes the second radio device 50b to transmit data including the fee information to the ETC vehicular device. The ETC vehicular device notifies the driver the fee information.

Step S512

If the fee classification information (A) fails to match the fee classification information (B), the processing circuit 40 causes the display device 60 to display the fee information and alert information.

Step S513

The processing circuit 40 causes the second radio device 50b to transmit data including the fee information and the alert information to the ETC vehicular device. The ETC vehicular device notifies the driver of the fee information and alerts the driver.

Step S514

If the fee classification information (A) fails to match the fee classification information (B), the vehicle 10 is suspected of unauthorized driving. The processing circuit 40 causes the storage device 44 to store in an associated form the captured image data on the license plate and the driver and vehicle data including vehicle information on the vehicle 10. The vehicle information is information on the vehicle 10, such as the length and the axle count of the vehicle.

As described above, the ETC 200 as the combination of the fifth and sixth embodiments may not only reliably determine the fee classification of the vehicle 10 but also may accurately detect suspicion of unauthorized driving of the vehicle 10 and store the data associated with the vehicle 10 on the storage device 44.

Seventh Embodiment

An example of the velocity measurement of the imaging system according to a seventh embodiment of the disclosure is described next with reference to FIG. 16A through FIG. 16C. In the previous embodiments, the velocity of the vehicle 10 is measured once. In contrast, the imaging system of the seventh embodiment measures the velocity of the vehicle 10 several times.

Figure 16A:
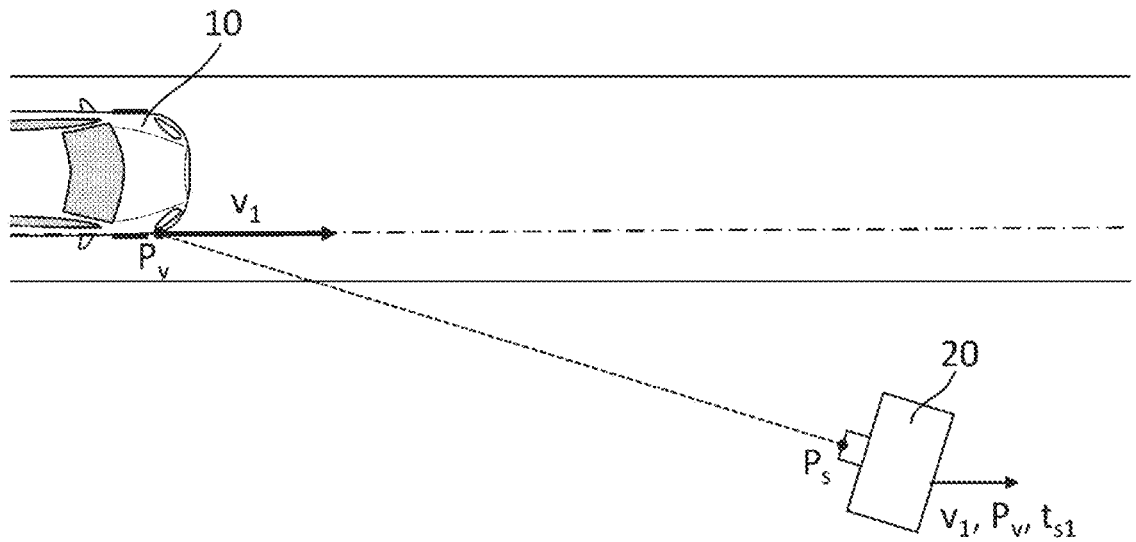
FIG. 16A schematically illustrates how the velocity of the vehicle is measured at first measurement time in an imaging system of a seventh embodiment.
Figure 16B:
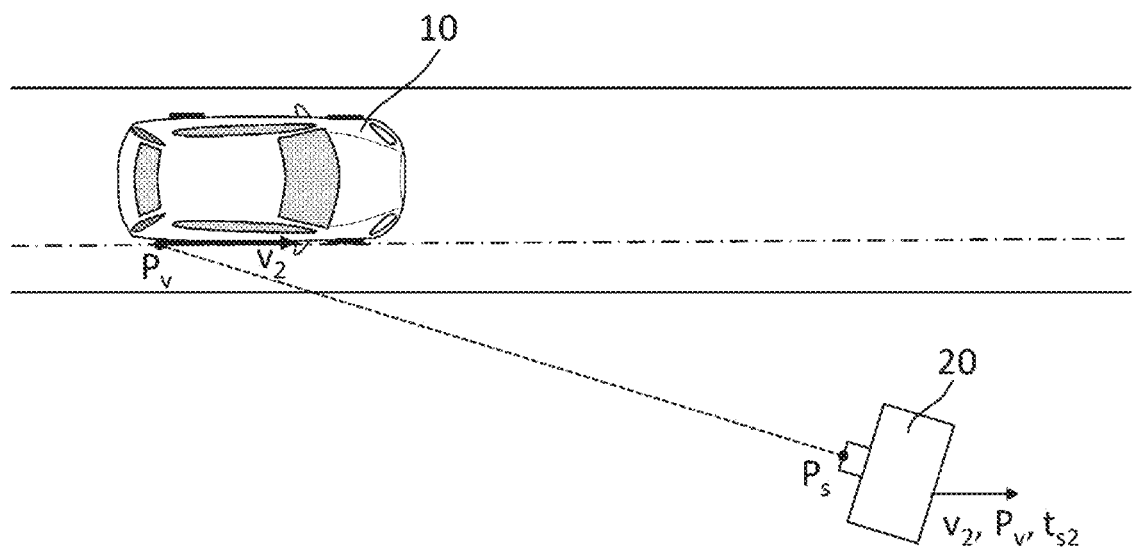
FIG. 16B schematically illustrates how the velocity of the vehicle is measured at second measurement time in the imaging system of the seventh embodiment.

FIG. 16A and FIG. 16B respectively schematically illustrate how the imaging system of the seventh embodiment measures the velocity of the vehicle 10 at first measurement time and second measurement time. Referring to FIG. 16A, the processing circuit 40 causes the sensor 20 to measure a velocity $v_1$ of the vehicle 10 at the first measurement time $t_{s1}$ and referring to FIG. 16B, the processing circuit 40 causes the sensor 20 to measure the velocity $v_2$ of the vehicle 10 at the second measurement time $t_{s2}$. The velocity measurement position $P_v$ is the same in FIG. 16A and FIG. 16B. The processing circuit 40 causes the sensor 20 to generate and output the measurement data. The measurement data includes velocity information on the velocity $v_1$ and the velocity $v_2$, the velocity measurement position information on the velocity measurement position $P_v$, and the measurement timing information on the first measurement time $t_{s1}$ and the second measurement time $t_{s2}$.

Figure 16C:
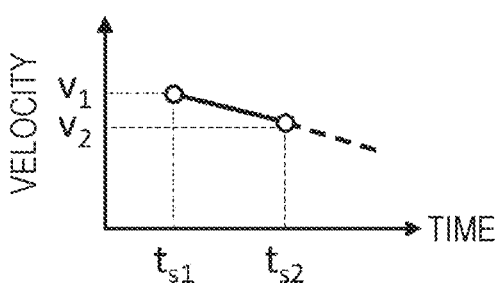
FIG. 16C is a graph illustrating a time variation in the velocity of the vehicle.

FIG. 16C is a graph illustrating a time variation in the velocity of the vehicle 10. Referring to FIG. 16C, the processing circuit 40 may acquire information on a velocity variation of the vehicle 10. If the vehicle 10 is in an acceleration trend or a deceleration trend, the processing circuit 40 may determine more accurately the imaging time of the vehicle 10 in accordance with multiple pieces of the velocity information at different time points. For example, if the vehicle 10 is decelerating as illustrated in FIG. 16C, the license plate or the driver or the passenger of the vehicle 10 may be imaged at the center of the angle of view by setting the imaging timing to be later than when the vehicle 10 is at a constant velocity. If the vehicle 10 is accelerating, the imaging timing is set to be earlier than when the vehicle 10 is at the constant velocity.

The example of the operation of the processing circuit 40 in the seventh embodiment is described below. The processing circuit 40 causes the sensor 20 to measure the velocity of the vehicle 10 several times and generate and output the measurement data. The velocity information included in the measurement data is information on the velocity of the vehicle 10 measured several times. The measurement timing information included the measurement data is information on timings at which the velocity of the vehicle 10 is measured multiple times.

Eighth Embodiment

An example of the velocity measurement of an imaging system according to an eighth embodiment of the disclosure is described below with reference to FIG. 17. In the embodiments described above, the velocity of the vehicle 10 is measured by the sensor 20. The imaging system of the eighth embodiment measures the velocity of the vehicle 10 with multiple sensors that measure the velocity from different angles.

Figure 17:
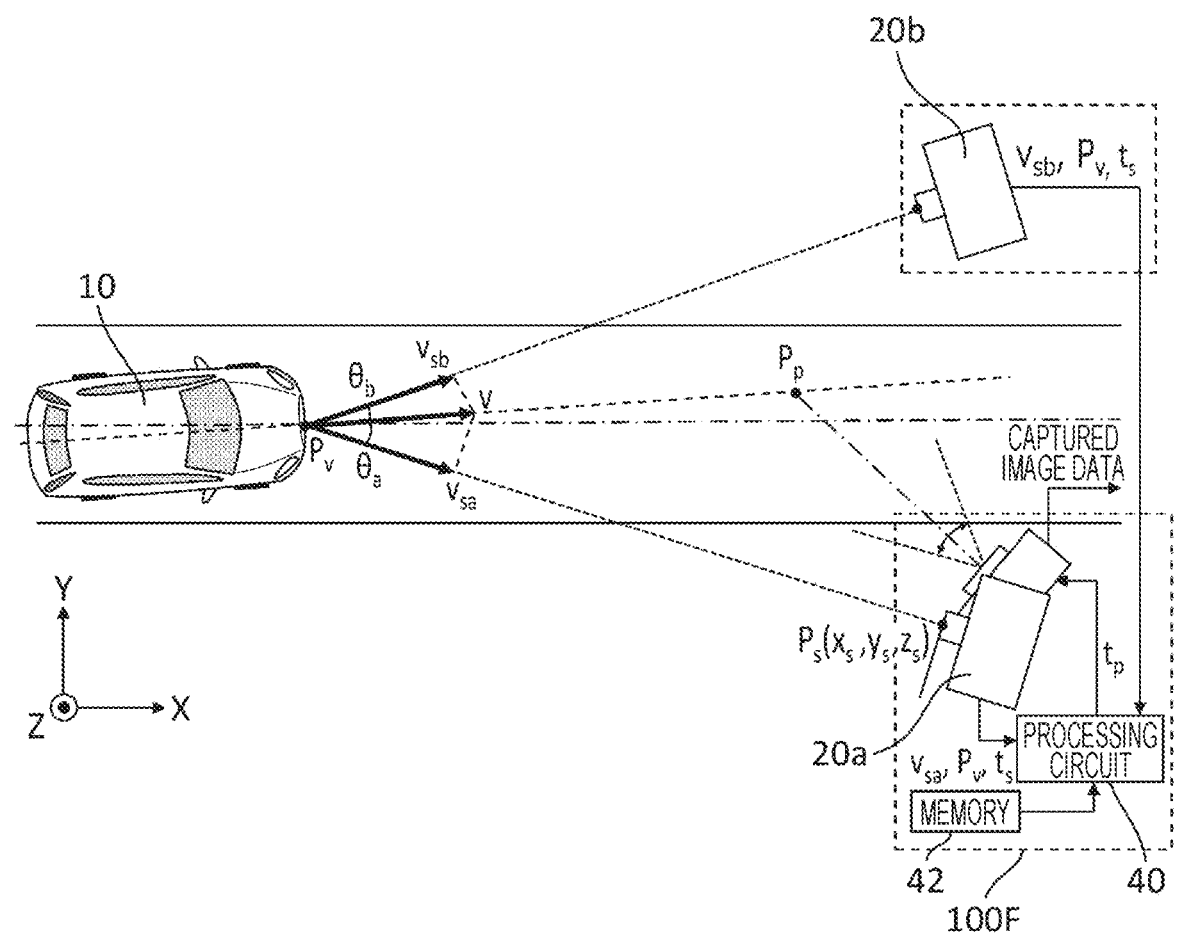
FIG. 17 schematically illustrates a configuration of an imaging system and a positional relationship between the imaging system and a vehicle according to an eighth exemplary embodiment of the disclosure.

FIG. 17 schematically illustrates the configuration of the imaging system and a positional relationship between the imaging system and the vehicle according to the eighth exemplary embodiment of the disclosure. The imaging system 100F illustrated in FIG. 17 is different from the imaging system 100A illustrated in FIG. 1 in that the imaging system 100F includes a first sensor 20a and a second sensor 20b rather than the single sensor 20. The first sensor 20a and the second sensor 20b are mounted at mutually different locations and measure the velocity v of the vehicle 10 from mutually different angles. The imaging target in the eighth embodiment is the license plate of the vehicle 10.

The processing circuit 40 causes the first sensor 20a and the second sensor 20b to measure relative velocity of the vehicle 10 at the same velocity measurement position $P_v$ at the same measurement time $t_s$. Specifically, the processing circuit 40 causes the first sensor 20a to measure the relative velocity $v_{sa}$ of the vehicle 10 and generate and output first measurement data. The first measurement data includes first velocity information on the relative velocity $v_{sa}$, first velocity measurement position information on the velocity measurement position $P_v$, and first imaging timing information on the measurement time $t_s$. Similarly, the processing circuit 40 causes the second sensor 20b to the relative velocity $v_{sb}$ of the vehicle 10 and generate and output second measurement data. The second measurement data includes second velocity information on the relative velocity $v_{sb}$, second velocity measurement position information on the velocity measurement position $P_v$, and second imaging timing information on the measurement time $t_s$.

The processing circuit 40 acquires the first and second measurement data and determines the velocity v of the vehicle 10 in accordance with the relative velocity $v_{sa}$ and the relative velocity $v_{sb}$ as described below. Let $\theta_a$ represent an angle between the running direction of the vehicle 10 and a direction opposite to the measurement direction of the first sensor 20a and Ob represent an angle between the running direction of the vehicle 10 and a direction opposite to the measurement direction of the second sensor 20b. The processing circuit 40 determines the angles $\theta_a$ and $\theta_b$ that satisfy the relationship of $v_{sa}/\cos\theta_a = v_{sb}/\cos\theta_b$. The running direction of the vehicle 10 and the velocity of the vehicle 10 $v = v_{sa}/\cos\theta_a = v_{sb}/\cos\theta_b$ are determined in accordance with the determined angles $\theta_a$ and $\theta_b$. If the running direction of the vehicle 10 is not parallel with the X direction as illustrated in FIG. 17, the processing circuit 40 may accurately determine the imaging position $P_p$ that may be imaged with the license plate of the vehicle 10 at the center of the angle of view. As a result, the license plate of the vehicle 10 running at a high velocity at any direction on the road may be more reliably imaged without being framed out.

The example of the operation of the processing circuit 40 of the eighth embodiment is described below. The processing circuit 40 causes the first sensor 20a to measure the velocity of the vehicle 10 and generate and output the first measurement data including the first velocity information. Similarly, the processing circuit 40 causes the second sensor 20b to measure the velocity of the vehicle 10 and generate and output the second measurement data including the second velocity information. The processing circuit 40 acquires the second measurement data in addition to the first measurement data and determines the velocity v of the vehicle 10 in accordance with the first velocity information and the second velocity information.

Ninth Embodiment

Figure 18:
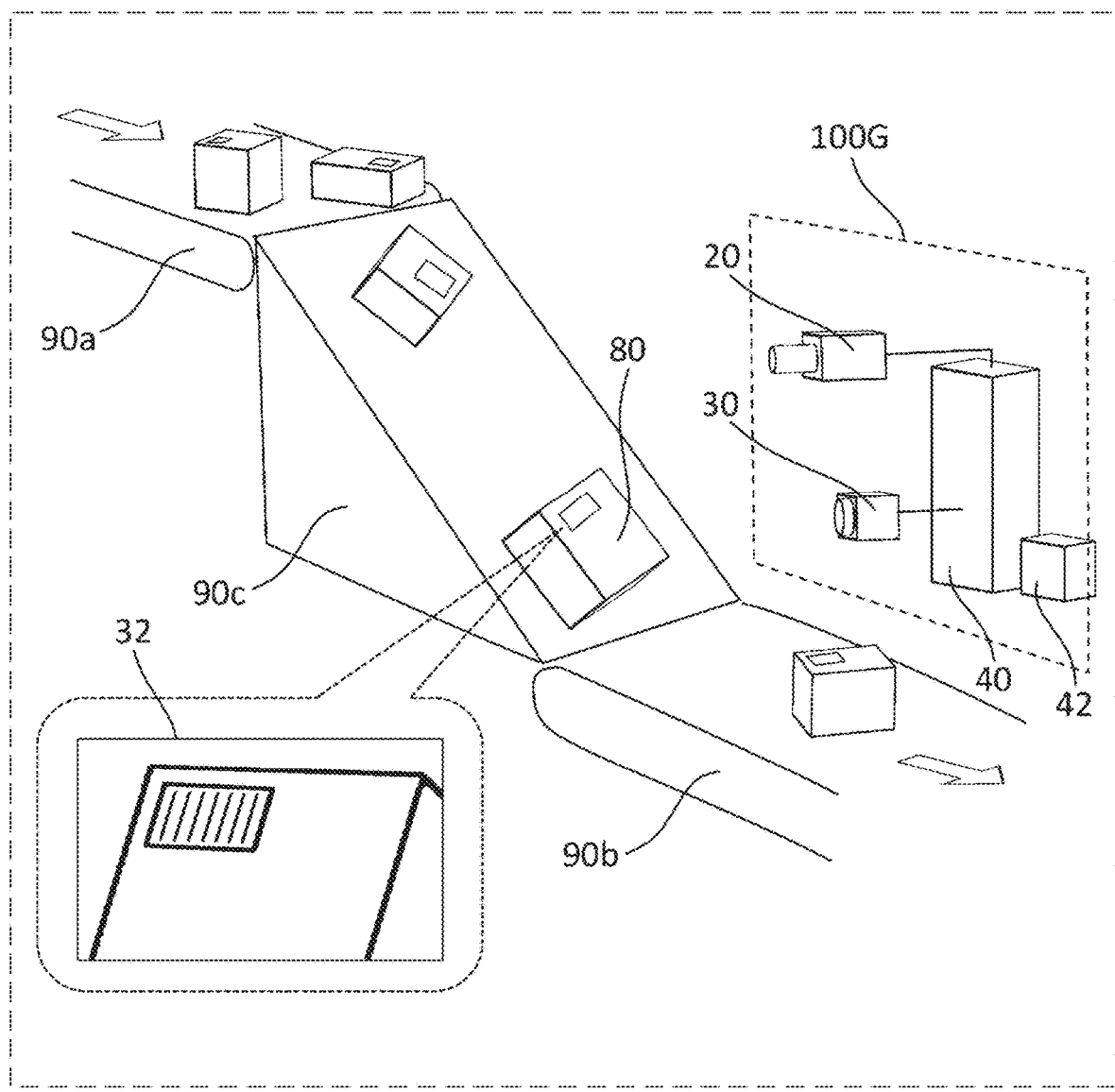
FIG. 18 schematically illustrates a configuration of an imaging system and a positional relationship between the imaging system and cardboard boxes according to a ninth exemplary embodiment of the disclosure.

In the embodiments described above, the object is the vehicle. The object may be any object that moves at a high velocity or a low velocity. Next, referring to FIG. 18, a measurement example of measuring the velocity of each cardboard box carried by a conveyor in a plant is described below. The transport velocity of the cardboard box is not so high as the running velocity of the vehicle. FIG. 18 schematically illustrates a configuration of an imaging system and a positional relationship between the imaging system and a cardboard box according to a ninth exemplary embodiment of the disclosure. Elements in the imaging system 100G of the ninth embodiment are identical to the elements in the imaging system 100A of the first embodiment. FIG. 18 illustrates two belt conveyors, a first belt conveyor 90a and a second belt conveyor 90b positioned at different height levels, and a base 90c having a slope connecting the belt conveyors. The outline arrow mark illustrated in FIG. 18 denotes the direction of transport of the cardboard boxes 80. Multiple cardboard boxes 80 are transported along the first belt conveyor 90a, the base 90c and the second belt conveyor 90b in this order. The cardboard boxes 80 may be transported using another mechanism. A barcode is attached to the surface of each of the cardboard boxes 80. The imaging target in the ninth embodiment is the barcode of each of the cardboard boxes 80.

The processing circuit 40 performs the same operation as described with reference to FIG. 4 and thus causes the camera 30 to image each of the cardboard boxes 80 sliding down the base 90c and generate and output captured image data. The captured image data includes captured image information on each of the captured images 32 of the cardboard boxes 80. The velocities of the cardboard boxes 80 sliding down the base 90c may not be equal to each other, for example, because of air resistance. In such a case, the imaging system 100G of the ninth embodiment may still image the cardboard 80 being transported without framing out. The imaging system 100G may image the cardboard 80 being transported on the belt conveyor instead of the cardboard 80 sliding down the base 90c.

The imaging system 100G of the ninth embodiment effectively operates even when the transport velocity of the belt conveyor varies in time or the transport velocities of the cardboard boxes 80 are different from each other. Information acquired from the surface of the cardboard box may not necessarily be the barcode but contents of a delivery slip, contents of the cardboard box, number of pieces in the cardboard box and expiration date of the pieces.

The elements and operations of the first through ninth embodiments may be combined in any combination as long as such combination is not contradictory.

INDUSTRIAL APPLICABILITY

The imaging systems of the disclosure may be applicable to a monitoring device in the ETC or an inspection device in a plant.

What is claimed is:
1. An imaging system comprising:
a sensor that measures a velocity of a moving object,
a camera that is different from the sensor and images the object, and a processing circuit that controls operations of the sensor and the camera, wherein the processing circuit:

causes the sensor to generate velocity information on the object and measurement timing information on the velocity by causing the sensor to measure the velocity of the object, generates control data, including imaging timing information on the camera, in accordance with (a) position information on the object or distance information on the object at the same time as the measurement of the velocity, (b) the velocity information, and (c) the measurement timing information, and causes the camera to output, in response to the control data, image data including image information on the object, wherein the imaging timing information varies depending on at least the velocity of the moving object.

2. The imaging system according to claim 1, wherein the processing circuit causes the camera to image the object in accordance with the imaging timing information on the camera.

3. The imaging system according to claim 1, wherein the processing circuit causes the camera to capture a video of the object and output the image data from the video captured by the camera.

4. The imaging system according to claim 1, wherein the control data further comprises at least one piece of information determining a Region Of Interest (ROI) included in an image captured by the camera, information determining a focus position of the camera, or information determining a position of the camera.

5. The imaging system according to claim 1, wherein the control data comprises at least one piece of information determining a pan rotation angle and/or a tilt rotation angle of the camera, or information determining a zoom magnification of the camera.

6. The imaging system according to claim 1, wherein the sensor comprises an oscillation source periodically performing frequency modulation and measures a position of the object or a distance to the object, and a velocity of the object by causing a wave reflected from the object and a reference wave to interfere with each other.

7. The imaging system according to claim 6, wherein the sensor is a Frequency Modulated Continuous Wave (FMCW)—Light Detecting and Ranging (LiDAR) device.

8. The imaging system according to claim 1, wherein the control data further comprises information determining a Region Of Interest (ROI) included in an image captured by the camera, and wherein the processing circuit causes the camera to extract the ROI from the captured image.

9. The imaging system according to claim 1, wherein the processing circuit generates, in accordance with the image data, classification data including classification information on the object.

10. The imaging system according to claim 1, wherein the control data further comprises at least one piece of information determining exposure time of the camera, or information determining an opening and closing degree of aperture of the camera.

11. The imaging system according to claim 1, wherein the object is a vehicle, and wherein an image indicated by the image data comprises an image of a license plate of the vehicle.

12. The imaging system according to claim 1, wherein the object is a vehicle, and wherein an image indicated by the image data comprises an image of a driver or a passenger of the vehicle.

13. The imaging system according to claim 1, wherein the object is a vehicle, the vehicle comprises a wheel, wherein the sensor measures a running velocity of the vehicle and a rotating velocity of the wheel, and wherein the velocity information relates to the running velocity of the vehicle and the rotating velocity of the wheel.

14. The imaging system according to claim 13, wherein the processing circuit generates, in accordance with the velocity information, axle count data including axle count information on the vehicle.

15. The imaging system according to claim 1, wherein the processing circuit causes the sensor to measure the velocity a plurality of times at different time points, wherein the velocity information relates to the velocity that has been measured the plurality of times, and wherein the measurement timing information relates to the respective times at which the velocity has been measured.

16. The imaging system according to claim 1, further comprises a second sensor that measures the velocity of the object from a different direction, wherein the processing circuit:

causes the second sensor to generate second piece of the velocity information on the object by causing the second sensor to measure the velocity of the object, and determines the velocity of the object in accordance with the velocity information and the second piece of the velocity information.

17. A processing device comprising:

a processor; and a memory that stores a computer program executed by the processor, wherein the computer program causes the processor to perform a process comprising:

causing a sensor to generate velocity information on an object and measurement timing information on a velocity of the object by causing the sensor to measure the velocity of the object, generating control data, including imaging timing information on a camera different from the sensor, in accordance with (a) position information on the object or distance information on the object at a time of velocity measurement, (b) the velocity information, and (c) the measurement timing information, and causing the camera to output, in response to the control data, image data including image information on the object, wherein the imaging timing information varies depending on at least the velocity of the object.

18. A method performed by a computer in an imaging system, the method comprising:

causing a sensor to generate velocity information on an object and measurement timing information on a velocity of the object by causing the sensor to measure the velocity of the object, generating control data, including imaging timing information on a camera different from the sensor, in accordance with (a) position information on the object or distance information on the object at a time of velocity measurement, (b) the velocity information, and (c) the measurement timing information, and causing the camera to output, in response to the control data, image data including image information on the object,
   wherein the imaging timing information varies depending on at least the velocity of the object.

* * * * *